(12) United States Patent
Gunter et al.

(10) Patent No.: US 8,662,443 B2
(45) Date of Patent: Mar. 4, 2014

(54) SHAPE MEMORY ALLOY ACTUATED TORSION LOCK

(75) Inventors: Ian M. Gunter, Burien, WA (US); Dan Clingman, Milton, WA (US)

(73) Assignee: The Boeing Company, Chicago, IL (US)

(*) Notice: Subject to any disclaimer, the term of this patent is extended or adjusted under 35 U.S.C. 154(b) by 213 days.

(21) Appl. No.: 13/019,973

(22) Filed: Feb. 2, 2011

(65) Prior Publication Data

US 2012/0193183 A1 Aug. 2, 2012

(51) Int. Cl.
B64C 13/02 (2006.01)

(52) U.S. Cl.
USPC .......................... 244/99.8; 192/82 T

(58) Field of Classification Search
USPC .............. 244/99.8, 99.2–99.3; 70/222–223, 70/182–186, 189; 192/82 T, 48.1, 48.3
See application file for complete search history.

(56) References Cited

U.S. PATENT DOCUMENTS

| 4,046,236 | A | 9/1977 | Hershman |
| 4,831,893 | A * | 5/1989 | Obama et al. .............. 74/490.05 |
| 6,065,934 | A | 5/2000 | Jacot |
| 6,499,952 | B1 | 12/2002 | Jacot et al. |
| 7,037,076 | B2 * | 5/2006 | Jacot et al. .................... 416/155 |
| 7,516,680 | B2 | 4/2009 | Clingman et al. |
| 7,771,392 | B2 | 8/2010 | De Polo |
| 8,172,811 | B2 | 5/2012 | Roe |
| 2003/0106761 | A1 | 6/2003 | Morris |
| 2007/0074753 | A1 | 4/2007 | Altali et al. |
| 2009/0212158 | A1 | 8/2009 | Mabe et al. |
| 2010/0018823 | A1 | 1/2010 | Melz et al. |
| 2010/0065679 | A1 | 3/2010 | Clingman et al. |
| 2011/0114434 | A1 | 5/2011 | Mankame et al. |

FOREIGN PATENT DOCUMENTS

| DE | 4009626 A1 * | 11/1991 | .................. 192/82 T |
| DE | 19624527 | 1/1997 | |
| JP | 2005036867 | 2/2005 | |

* cited by examiner

*Primary Examiner* — Rob Swiatek
*Assistant Examiner* — Timothy Schwarz

(57) ABSTRACT

A torsion lock may include a clutch, a spring, and a shape memory alloy (SMA) member. The spring may cause the application of pressure on the clutch for engagement thereof. The SMA member may linearly contract when heated in a manner to relieve the pressure on the clutch for disengagement thereof.

20 Claims, 21 Drawing Sheets

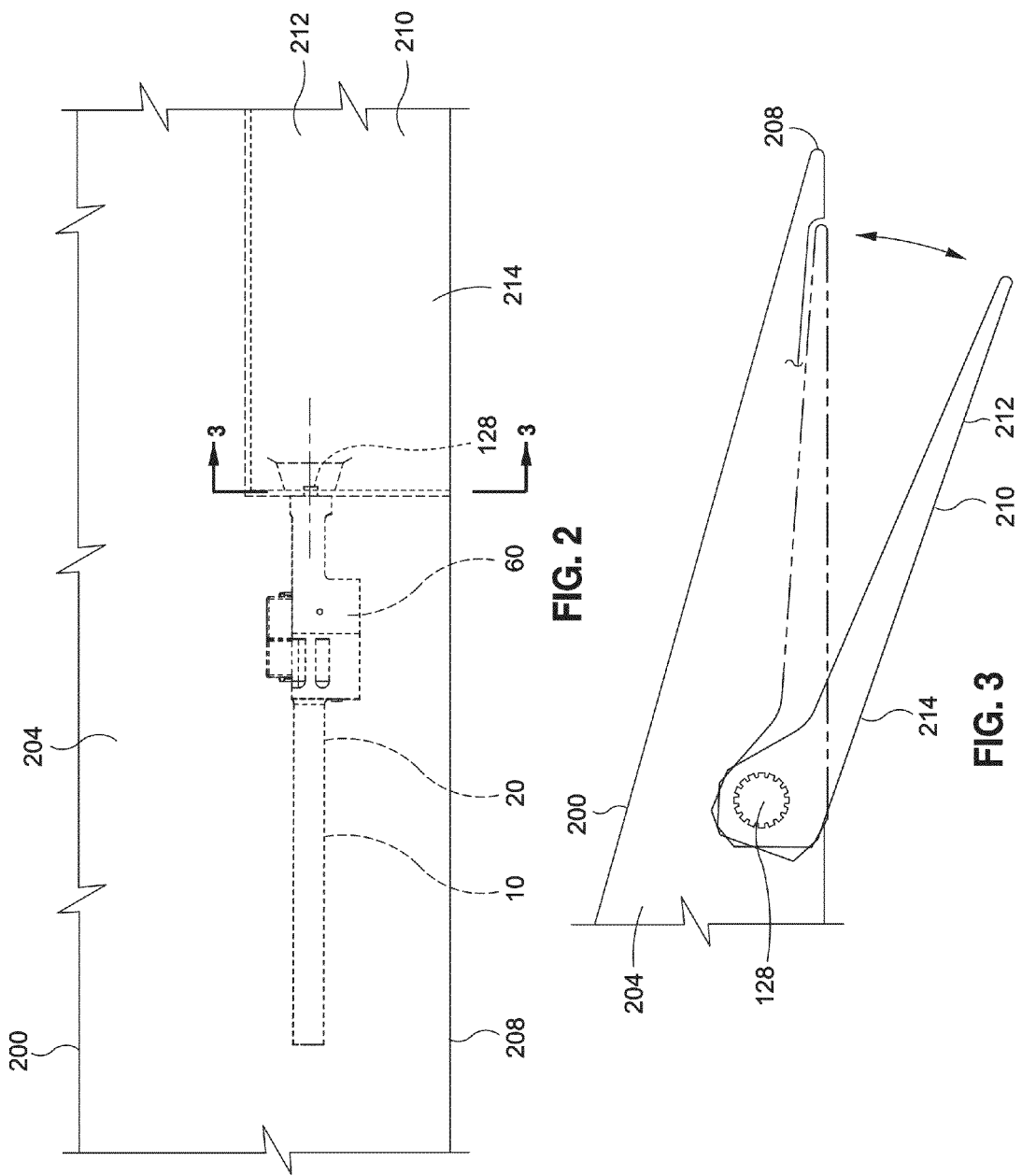

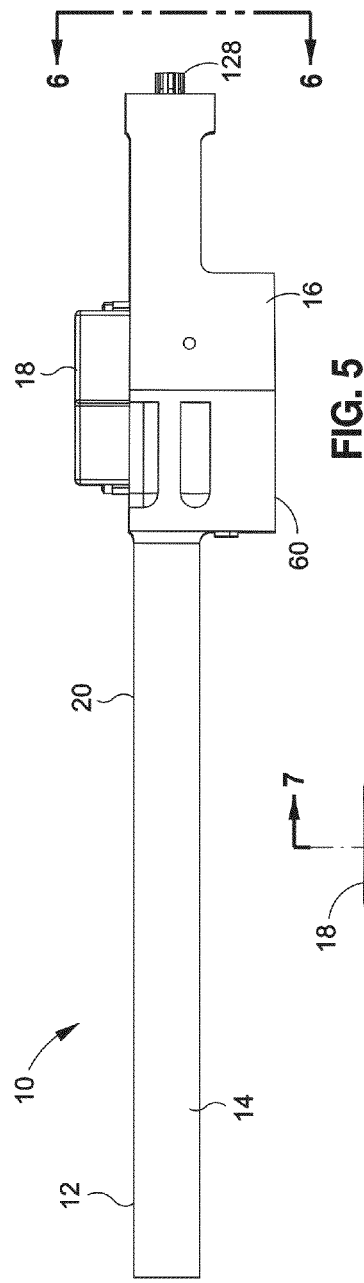
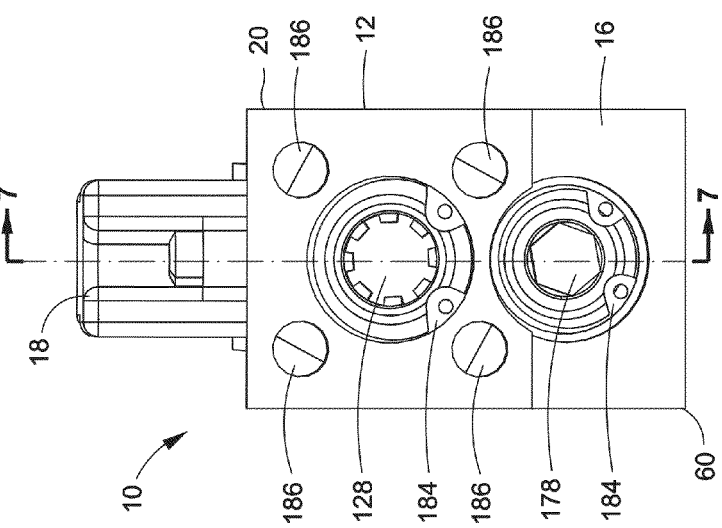

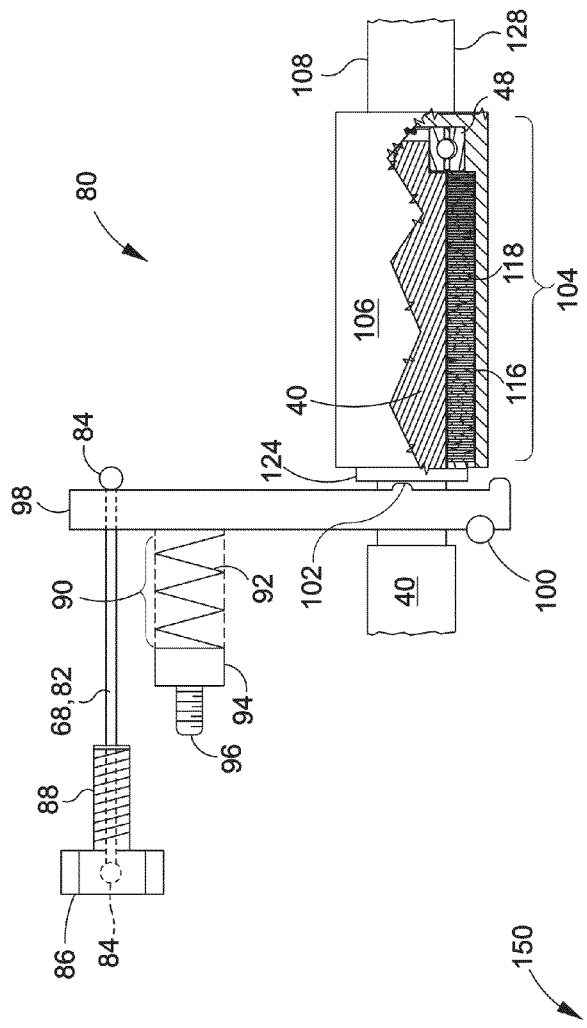
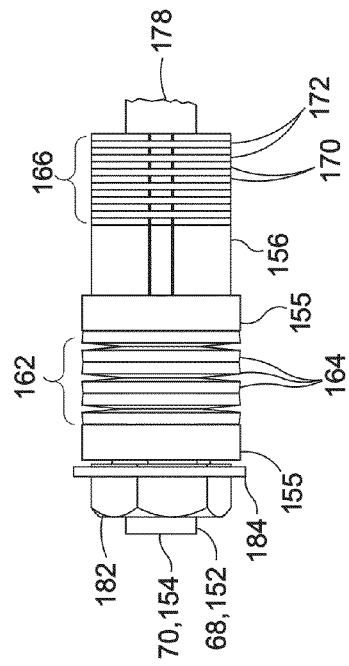
FIG. 8B
FIG. 8A

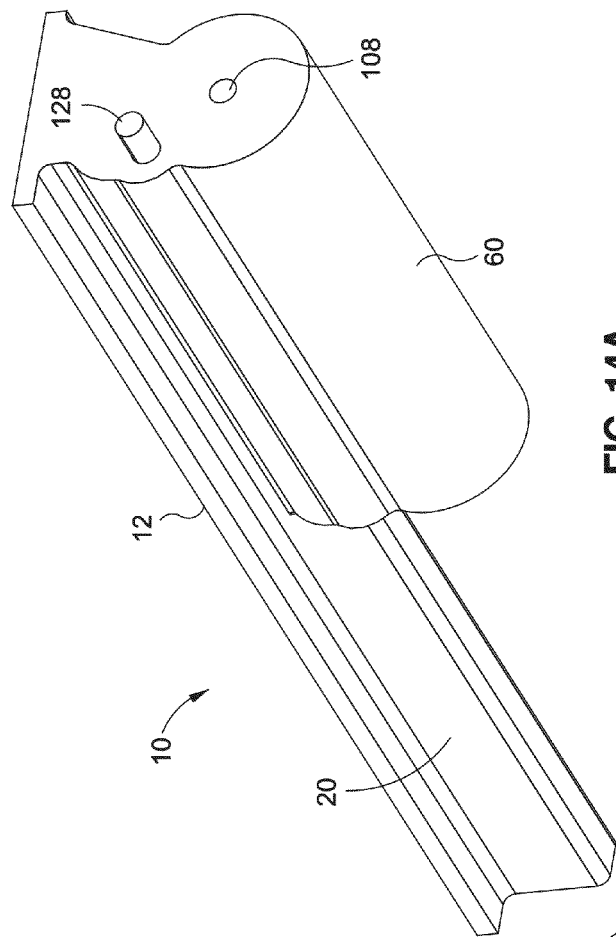
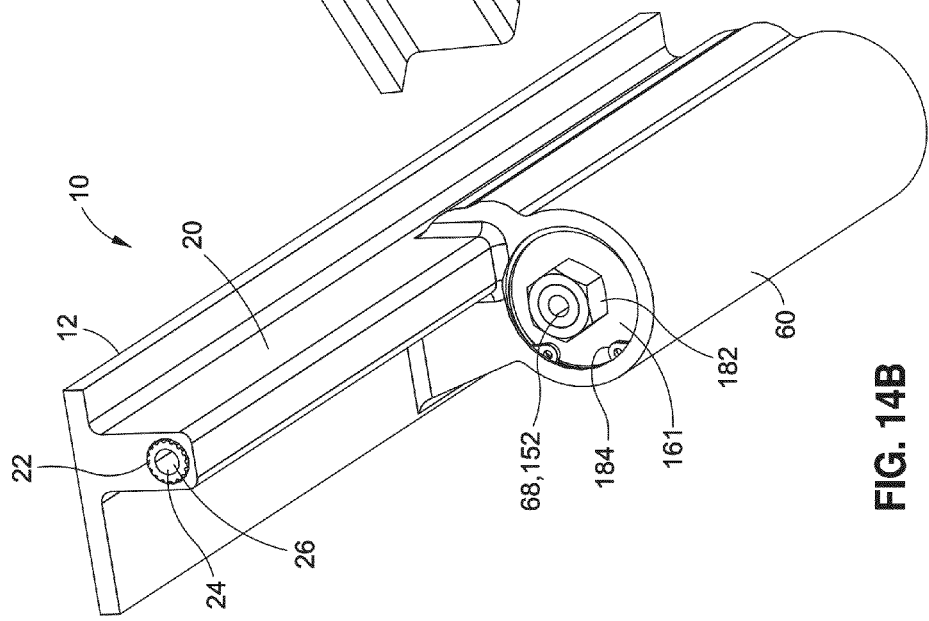
FIG. 14A
FIG. 14B

SHAPE MEMORY ALLOY ACTUATED TORSION LOCK

FIELD

The present disclosure relates generally to actuator systems and, more particularly, to a torsion lock assembly for an actuator system.

BACKGROUND

Aircraft typically include a variety of movable aerodynamic devices for directional control of the aircraft and for altering the lift characteristics of the aircraft. For example, fixed wing aircraft typically includes slats and flaps mounted to the leading and trailing edges of the wings. Certain aircraft may include Krueger flaps mounted to the inboard section of the wings on the leading edge and slats mounted to the outboard section of the wings on the leading edge. The Krueger flaps and the slats may be deployed from the leading edge of the wings during certain phases of flight in order to increase effective wing camber and maintain airflow over the wings at high angles of attack.

Flaps may also be mounted to the trailing edges of the wings in order to increase the lift generated by the wings when the aircraft is moving at relatively low airspeeds. For example, trailing edge flaps may be deployed by downwardly angling the flaps during takeoff to increase lift and may then be retracted during the cruise portion of the flight. The flaps may again be deployed during the approach and landing phases of the flight in order to increase lift by increasing effective wing camber and wing area to compensate for the lower airspeed of the aircraft during landing.

In addition, certain aircraft may include Gurney flaps configured as small spanwise protrusions which may be deployable perpendicularly from the wing trailing edge on the underside of the wings to increase the wing lift coefficient when the aircraft is moving at relatively high airspeeds such as during cruise flight. Gurney flaps may increase the wing lift coefficient without significantly increasing drag by extending no further than the boundary layer of the airflow passing over the wings. Gurney flaps may maintain attachment of the airflow over the wing surface and thereby improve the aerodynamic efficiency of the wings which may reduce fuel consumption.

Aerodynamic devices such as the above-mentioned flaps and slats are required by the Federal Aviation Administration (FAA) to include a locking mechanism such as a torsion lock for maintaining the device in the selected deployed position without intervention by the pilot. The requirement for maintaining the aerodynamic device at the deployed position extends to events such as a power failure of the aircraft power system. However, FAA regulations allow for automatic retraction of aerodynamic devices from the deployed position in certain circumstances. For example, aerodynamic devices may be automatically retracted upon the aircraft encountering wind shear to avoid overloading the wing structure. For an aircraft fitted with Gurney flaps and moving at 500 to 600 miles per hour typical of cruise flight, it may be necessary to retract or stow the Gurney flaps in a relatively short period of time (i.e., several milliseconds) to prevent overloading the wing.

The prior art includes several actuator configurations including hydraulic and electro-mechanical actuators for deploying and retracting aerodynamic devices. Although generally effective for their intended purpose, hydraulic and electro-mechanical actuators may have a relatively low specific holding torque for maintaining an aerodynamic device in a deployed position and therefore must be relatively large in physical size to generate sufficient holding torque to lock the aerodynamic device in the deployed position. Unfortunately, the relatively large physical size of prior art actuators presents challenges in integrating the actuator into the narrow confines of the wing trailing edge. In addition, the relatively large physical size of such actuators increases weight, complexity and cost of the aircraft. Furthermore, such prior art actuators may lack the ability to retract or release an aerodynamic device such as a Gurney flap from its deployed position in an extremely short period of time (i.e., several milliseconds) upon encountering wind shear for an aircraft moving at relatively high airspeeds (e.g., 500-600 mph).

As can be seen, there exists a need in the art for a torsion lock for an actuator which is of relatively small size and which can generate a relatively large holding torque for maintaining a deployable device in a deployed position. Furthermore, there exists a need in the art for a torsion lock capable of retracting or releasing a deployable device in a relatively short period of time on the order of milliseconds.

SUMMARY

The above-noted needs associated with torsion locks for actuator systems are addressed and alleviated by the present disclosure which, in an embodiment, provides a torsion lock assembly including a clutch, a spring, and a shape memory alloy (SMA) member. The spring may be configured to cause the application of pressure on the clutch for engagement thereof. The SMA member may linearly contract when heated in a manner to relieve the pressure on the clutch for disengagement thereof.

In a further embodiment, disclosed is a torsion lock assembly for an actuator system having an actuator drive shaft. The torsion lock assembly includes an assembly housing, a lock subassembly, and a quick release subassembly. The lock subassembly may include a lock clutch, a lock spring, and an SMA tube. The lock clutch may couple the drive gear shaft to the assembly housing. The lock spring may cause the application of pressure on the lock clutch for engagement thereof. The SMA tube may linearly contract when heated in a manner relieving the pressure on the lock clutch for disengagement thereof to allow rotation of the drive gear shaft.

The quick release subassembly may include a quick release clutch, a quick release spring, and an SMA wire. The quick release clutch may couple the drive gear shaft to an output shaft. The quick release spring may cause the application of pressure on the quick release clutch for engagement thereof. The SMA wire may linearly contract when heated in a manner relieving the pressure on the quick release clutch for disengagement thereof to allow rotation of the output shaft relative to the drive gear shaft.

Also disclosed is a method of disengaging a clutch. The method may include the steps of applying pressure to the clutch for engagement thereof. The method may further include heating a shape memory alloy (SMA) member coupled to the clutch. The SMA member may linearly contract in response to the heating. The method may further include relieving the pressure on the clutch in response to the linear contraction of the SMA member in a manner causing disengagement of the clutch.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 2 is a top view of a portion of the trailing edge of the aircraft wing taken along line 2 of FIG. 1 and illustrating an actuator system operatively coupled to a split flap mounted to the trailing edge of the wing;

FIG. 3 is a sectional view of the trailing edge of the wing taken along line 3 of FIG. 2 and illustrating the deployed position of the split flap;

FIG. 5 is a side view illustration of the actuator system illustrating the assembly housing;

FIG. 6 is an end view illustration of the actuator system taken along line 6 of FIG. 5 and illustrating an output shaft of the torsion lock assembly;

FIG. 8A is a side view of the lock subassembly including the lock clutch, a lock spring, and an SMA member configured as an SMA tube;

FIG. 8B is a side view of the quick release subassembly including a quick release clutch, a quick release spring, and an SMA member configured as an SMA wire;

FIG. 14A is a perspective illustration of the actuator system including the torsion lock assembly in an alternative embodiment;

FIG. 14B is a further perspective illustration of the actuator system including the torsion lock assembly in the alternative embodiment;

DETAILED DESCRIPTION

Figure 1:
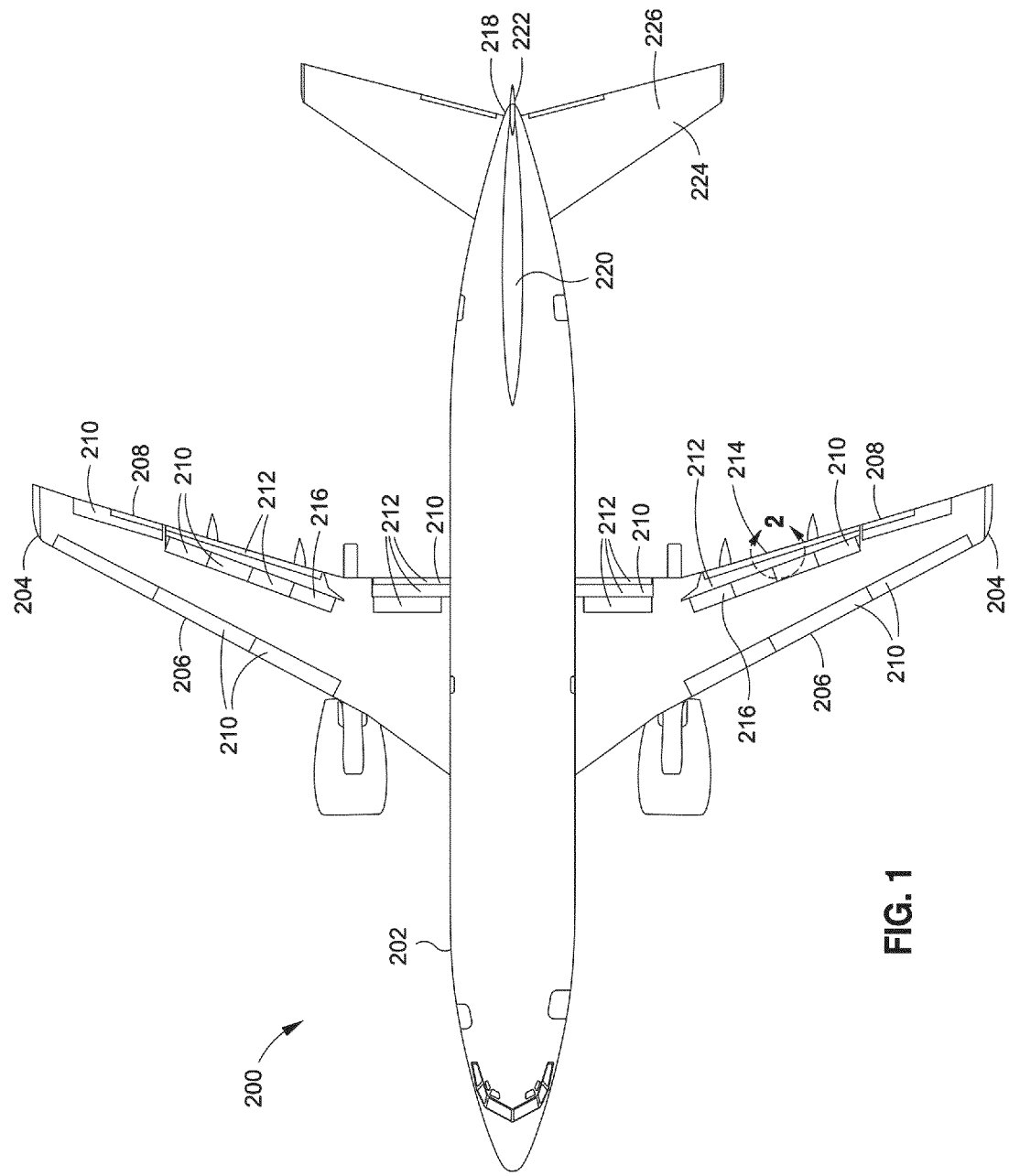
FIG. 1 is a top view illustration of an aircraft having one or more deployable devices which may be mounted to the aircraft such as to the leading and trailing edges of the aircraft wings.

Referring now to the drawings wherein the showings are for purposes of illustrating preferred and various embodiments of the disclosure, shown in FIG. 1 is a top view of an aircraft 200 which may incorporate an actuator system 10 (FIG. 2) having a torsion lock assembly 60 (FIG. 2) as disclosed herein. The actuator system 10 (FIG. 2) may be adapted for deploying any number of deployable devices 210 including, but not limited to, aerodynamic devices 212 which may be mounted to the aircraft 200 illustrated in FIG. 1. The aircraft 200 may include a fuselage 202 having an empennage 218 which may include a horizontal stabilizer 224, an elevator 226, a vertical stabilizer 220 and a rudder 222 for directional control.

The aircraft 200 in FIG. 1 may include a variety of aerodynamic devices 212 mounted to the leading and trailing edges 206, 208 of the wings 204 for altering the lift and drag characteristics of the wings 204. For example, the aerodynamic devices 212 may comprise leading edge 206 slats and/or flaps such as Krueger flaps which may be deployable from the leading edge 206 of the wings 204 to increase the effective camber of the wings 204 and maintain airflow over the upper surfaces of the wings 204 at high angles of attack. The wings 204 may also include spoilers 216 for reducing the lift of the wings 204 such as during landing such that the weight of the aircraft 200 may be transferred to the landing gear for improved braking. The trailing edge 208 of the wing 204 may incorporate any number of aerodynamic devices 212 including flaps mounted to the trailing edges 208 of the wings 204. The flaps may be of any configuration without limitation including splits flaps, slotted flaps and Gurney flaps for improving the lift characteristics of the wings 204.

Referring to FIG. 2, shown is a portion of the trailing edge 208 of the wing 204 of FIG. 1 and illustrating an actuator system 10 incorporating a torsion lock assembly 60 as disclosed herein. As can be seen in FIG. 2, the actuator system 10 may be operatively coupled to a deployable device 210 such as the split flap 214. The actuator system 10 in FIG. 2 may be adapted for deploying and retracting the split flap 214. For example, the split flap 214 may be deflected downwardly during deployment as best seen in FIG. 3. As will be described in greater detail below, the torsion lock assembly 60 is specifically configured to lock the deployable device 210 in the desired position after deployment by the actuator system 10 and to rapidly release the deployable device 210 when desired. For example, the torsion lock assembly 60 may maintain the split flap 214 shown in FIG. 3 at a desired flap setting and may rapidly release the split flap 214 when the aircraft 200 encounters certain conditions as described below.

Figure 4A:
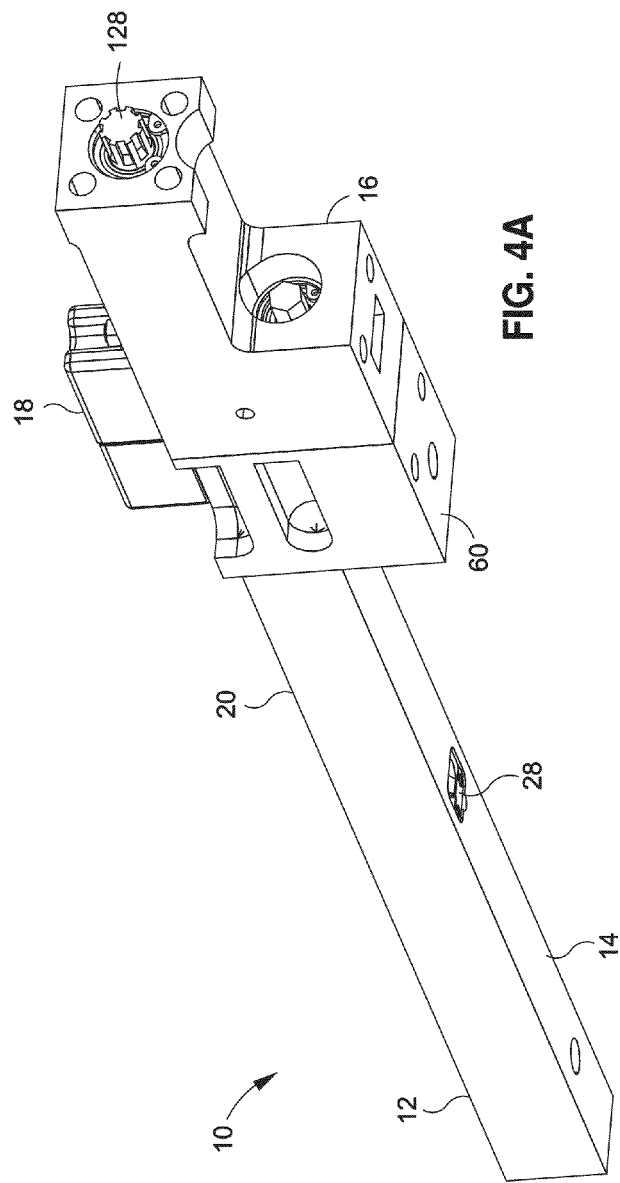
FIG. 4A is a perspective illustration of the actuator system incorporating a torsion lock assembly having one or more shape memory alloy (SMA) members for controlling the engagement and disengagement of one or more clutches of the actuator system.
Figure 4B:
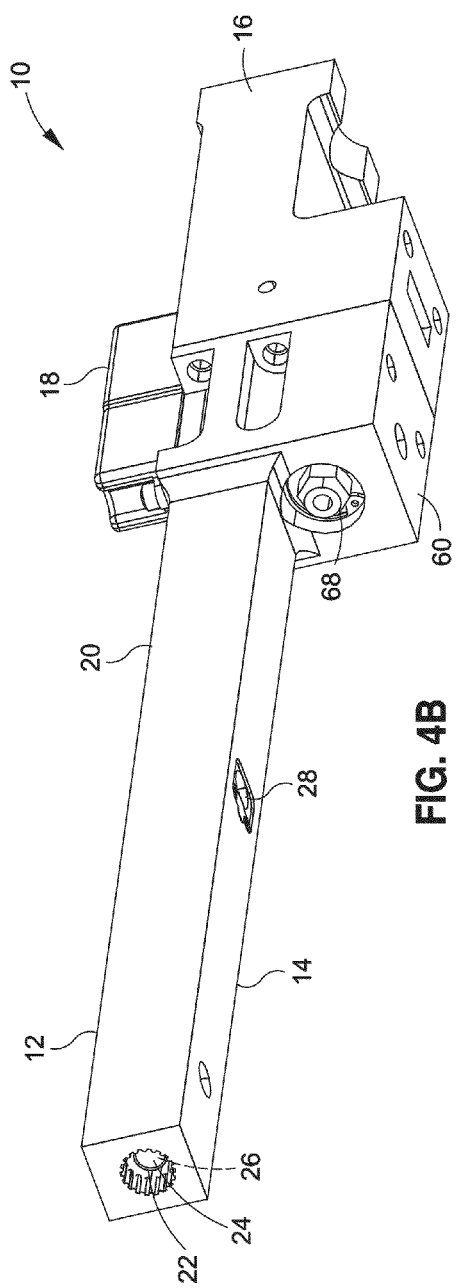
FIG. 4B is a further perspective illustration of the actuator system illustrating an assembly housing for housing an actuator drive assembly and the torsion lock assembly.

Referring to FIGS. 4A and 4B, shown is an assembly housing 12 for containing the actuator drive assembly 20 and the torsion lock assembly 60. The actuator drive assembly 20 may include a shape memory alloy (SMA) actuator torque tube 24 (FIG. 4B) for deploying and retracting the deployable device 210 (FIG. 2). The deployable device 210 (FIG. 2) may be mounted to an output shaft 128 (FIG. 4A) of the actuator system 10. The SMA actuator torque tube 24 (FIG. 4B) may be trained to twist when heated causing rotation and deployment of the deployable device 210 (FIG. 2) as described below. The assembly housing 12 may include a temperature probe 28 to monitor the temperature of the SMA actuator torque tube 24 (FIG. 4B) as may be desired for determining the magnitude and rate at which heat is applied to the SMA actuator torque tube 24 and, thereby, monitor the rate of twisting of the SMA actuator torque tube 24.

The assembly housing 12 shown in FIGS. 4A-4B may be comprised of a first housing portion 14 and a second housing portion 16 to facilitate assembly and maintenance of the torsion lock assembly 60. The assembly housing 12 may be provided in alternative configurations including, but not limited to, a unitary housing configuration. Further in this regard, it is contemplated that the assembly housing 12 may comprise one or more mounting brackets or fittings (not shown) for mounting the components of the actuator system 10 to a structure such as an internal wing structure (not shown). In this regard, the assembly housing 12 is not necessarily limited to a configuration for containing the actuator system 10 components within the assembly housing 12. The assembly housing 12 may include a cover 18 which may be removable to provide access to the torsion lock assembly 60 for adjustment as described below.

Referring to FIG. 5, shown is a side view of the assembly housing 12 including the first housing portion 14, the second housing portion 16, and the cover 18 which may be mounted on an upper side of the assembly housing 12. In this regard, it should be noted that the configuration of the assembly housing 12 illustrated in FIGS. 1-5 is representative of one embodiment of the assembly housing 12 for the actuator system 10. As indicated earlier, the assembly housing 12 may be configured in any size, shape or configuration for housing the actuator system 10. Furthermore, the actuator system 10 may incorporate any one of a variety of actuator drive assembly 20 configurations and is not limited to an SMA actuator torque tube 24 as described above. For example, the actuator drive assembly 20 may be configured as an electro-mechanical device, a pneumatic device, a hydraulic device or any other suitable device or mechanism or combination of such devices or mechanisms.

Referring to FIG. 6, shown is an end view of the actuator system 10. The second housing portion 16 may be joined to the first housing portion 14 (FIG. 5) by means of one or more mechanical fasteners 186, as illustrated in FIG. 6, although any other suitable mechanism may be implemented for assembling and joining the first and second housing portions 14, 16. The output shaft 128 of the torsion lock assembly 60 may extend out of the assembly housing 12 as best seen in FIG. 5. As shown in FIG. 6, the output shaft 128 may be retained to the second housing portion 16 by means of a retainer mechanism 184 such as a snap ring. Likewise, a retainer mechanism 184 such as a snap ring may be employed for retaining a lock gear shaft 178 to the second housing portion 16.

Figure 7:
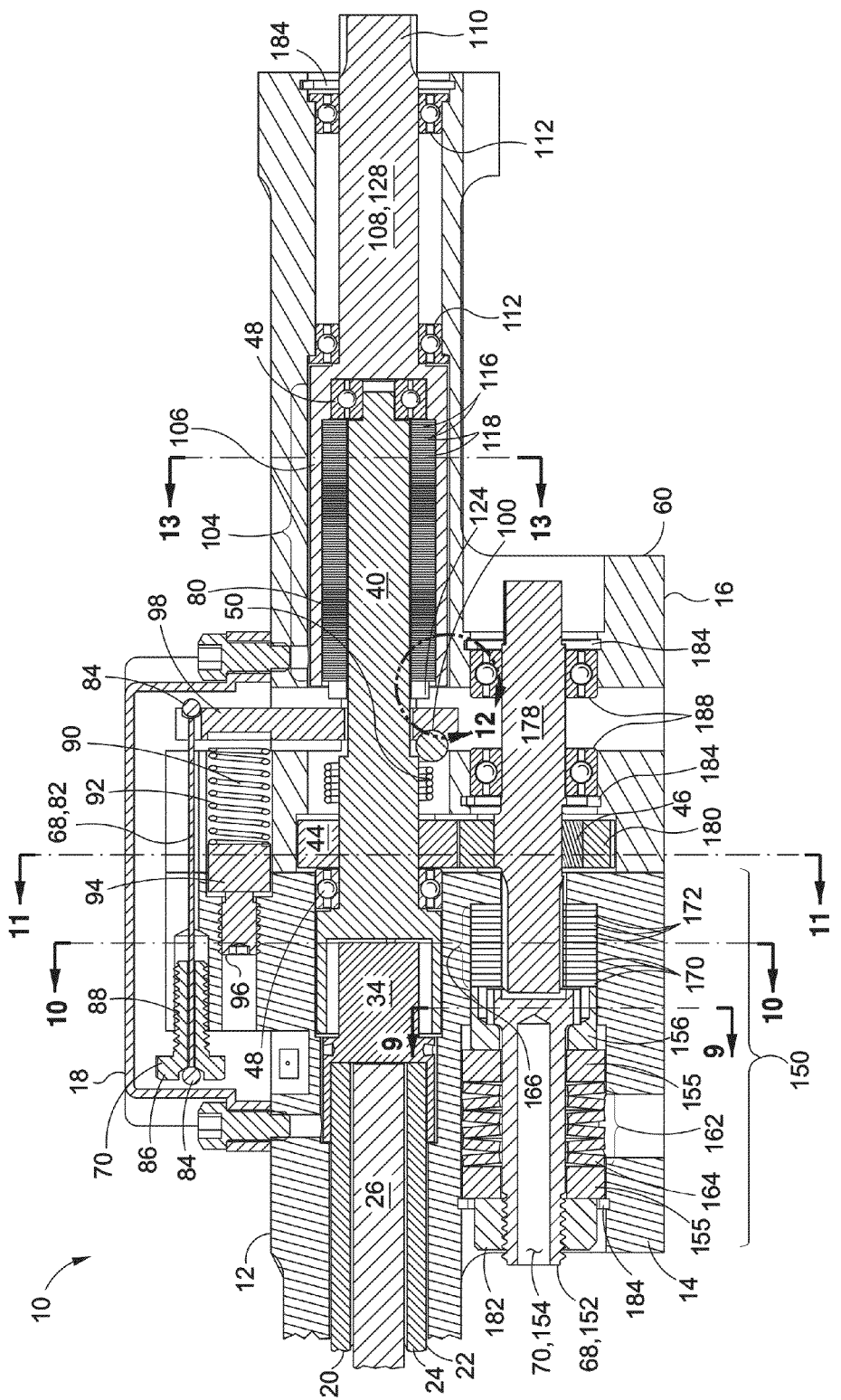
FIG. 7 is a sectional illustration of the actuator drive assembly and torsion lock assembly taken along line 7 of FIG. 6 and illustrating a lock subassembly and a quick release subassembly housed within an assembly housing and illustrating a quick release clutch axially aligned with the actuator drive assembly.
Figure 8:
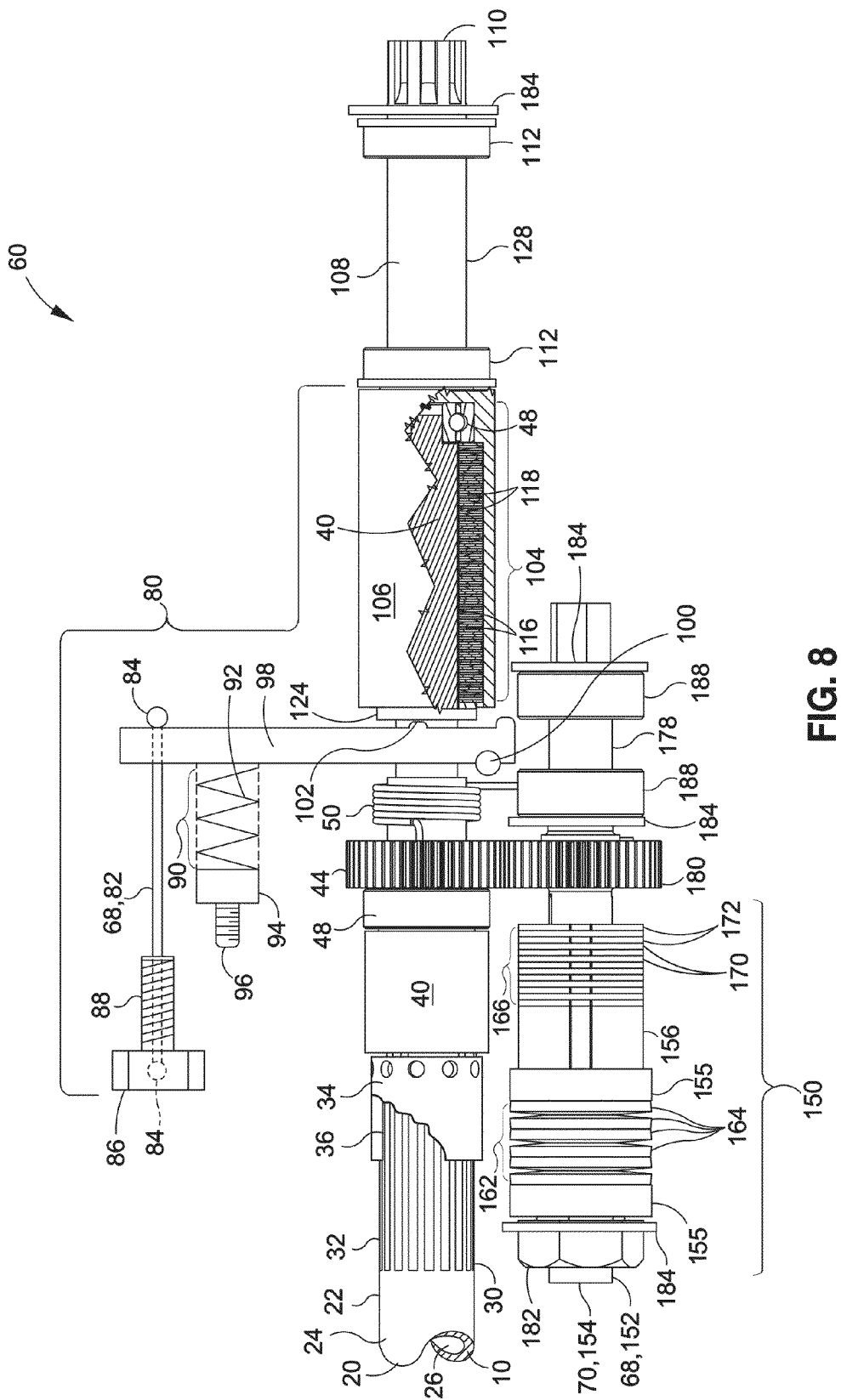
FIG. 8 is a side view illustration of the actuator drive assembly and torsion lock assembly with the assembly housing removed for clarity.

Referring to FIGS. 7-8, shown is the actuator system 10 comprising the actuator drive assembly 20 and the torsion lock assembly 60. FIG. 7 shows the actuator drive assembly 20 and the torsion lock assembly 60 housed within the assembly housing 12. In FIG. 8, the assembly housing 12 is omitted such that FIG. 8 shows only the actuator drive assembly 20 and the torsion lock assembly 60. The actuator drive assembly 20 includes an actuator drive shaft 22. The actuator drive shaft 22 may comprise an SMA actuator torque tube 24. The SMA actuator torque tube 24 may include a hollow interior as shown in FIG. 7 for housing a heater 26 for heating the SMA actuator torque tube 24.

The SMA actuator torque tube 24 may be formed of a suitable SMA material. For example, the SMA material may comprise nickel-titanium such as nitinol. The SMA material may have a two-way shape effect to allow the SMA actuator torque tube 24 to twist from an original shape to a trained shape and twist back from the trained shape to the original shape. The SMA actuator torque tube 24 may be trained to twist by repeatedly torquing the SMA actuator torque tube 24 to a predetermined stress level (e.g., 15-20 ksi). When the SMA actuator torque tube 24 is heated above a transition temperature, the SMA material reaches an austenite condition causing the SMA actuator torque tube 24 to untwist and resume its original pre-twisted shape. When heat is allowed to dissipate such that the SMA actuator torque tube 24 cools below the transition temperature, the SMA actuator torque tube 24 returns to its original shape in the martensite condition. In this manner, the SMA actuator torque tube 24 provides a means for deploying and retracting the deployable device 210 (FIG. 2) by alternatively heating and cooling the SMA actuator torque tube 24.

Figure 10:
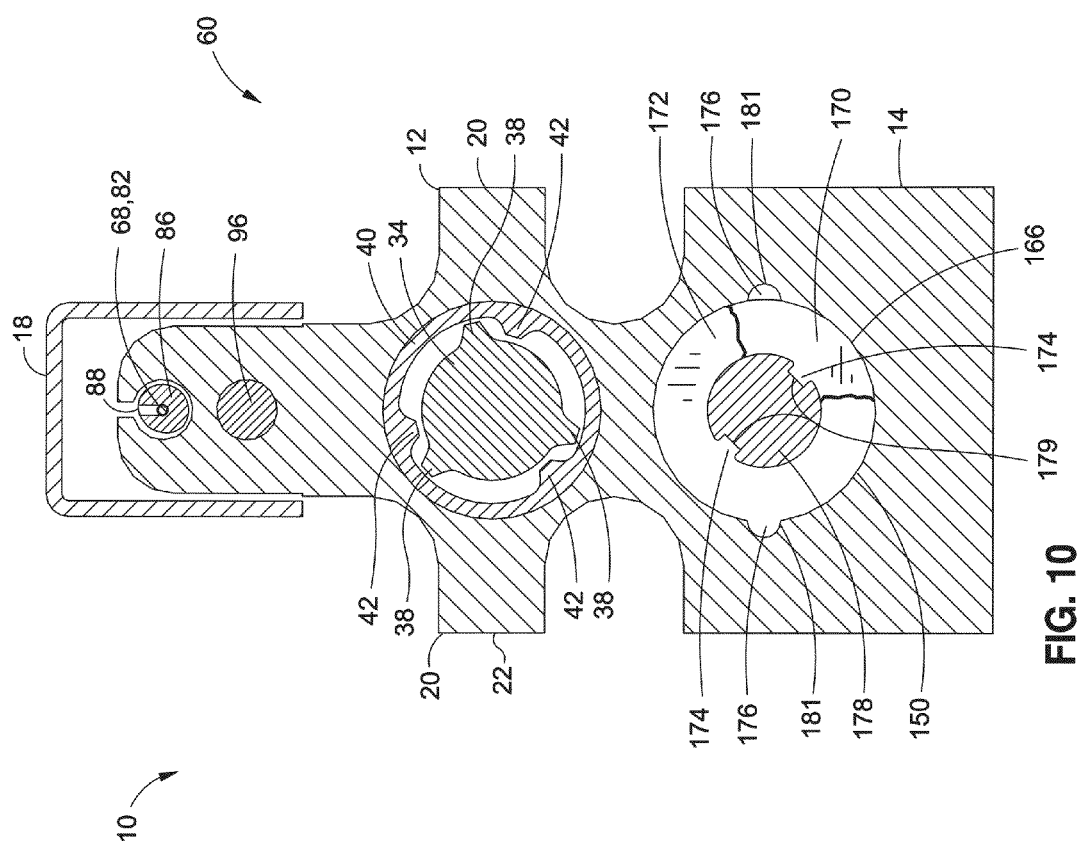
FIG. 10 is a sectional illustration of the torsion lock assembly taken along line 10 of FIG. 7 and illustrating an actuator drive shaft having ribs for engaging shaft ribs of a drive gear shaft and further illustrating inner and outer clutch plates of the lock clutch.

FIGS. 7-8 illustrate the interconnection of the actuator drive shaft 22 to the torsion lock assembly 60. As shown in FIG. 8, the actuator drive shaft 22 may include shaft splines 32 formed on an exterior surface of a drive end 30 of the actuator drive shaft 22. FIG. 8 illustrates the shaft splines 32 mating with fitting splines 36 formed on an inner surface of an end fitting 34. As shown in FIG. 7, the end fitting 34 may extend into a hollow portion of the drive gear shaft 40. As shown in FIG. 10, the end fitting 34 may engage the drive gear shaft 40 by means of a plurality of angularly-spaced end fitting ribs 38 formed on the exterior of the end fitting 34. The end fitting ribs 38 may be configured to rotate into engagement with a complementary set of shaft ribs 42 formed on an interior surface of the drive gear shaft 40 as shown in FIG. 10. The end fitting ribs 38 and the shaft ribs 42 may be arranged such that the end fitting 34 may rotate by a limited amount relative to the drive gear shaft 40 prior to engagement of the end fitting ribs 38 with the shaft ribs 42 as described below.

Figure 11:
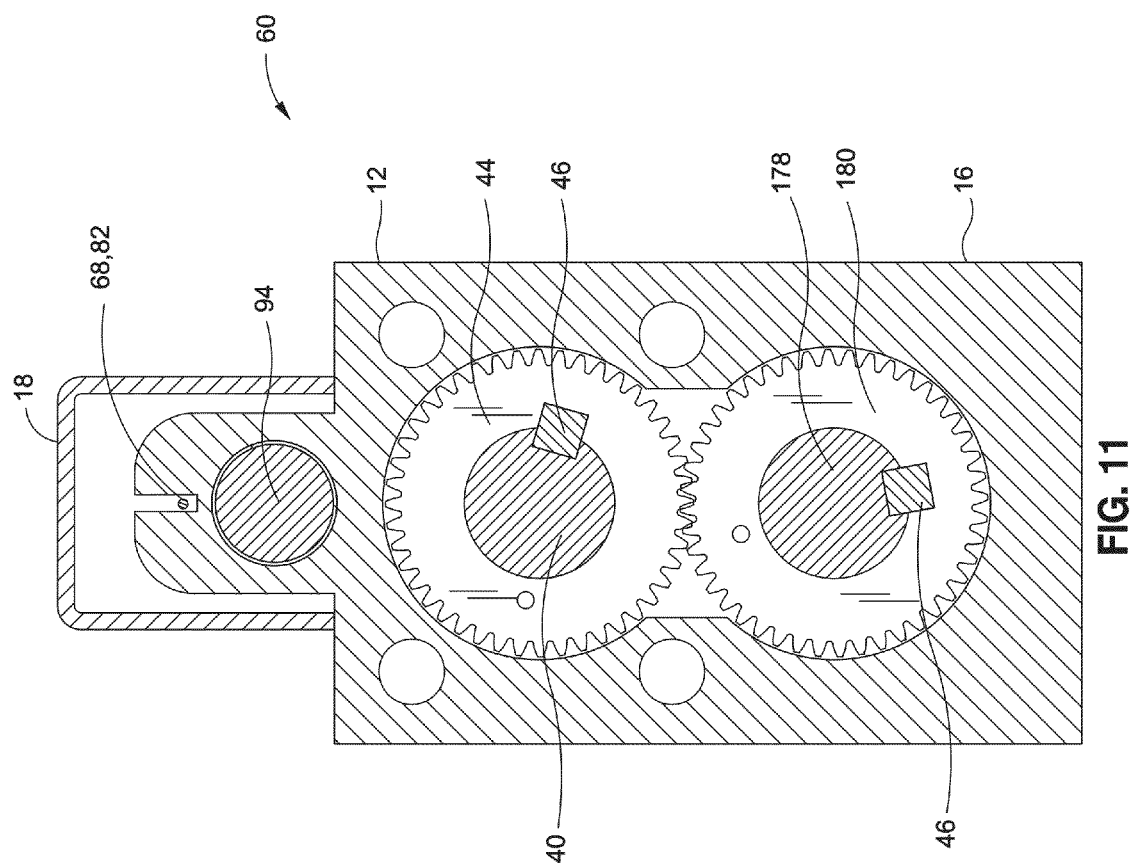
FIG. 11 is a sectional view of the torsion lock assembly taken along line 11 of FIG. 7 and illustrating a drive gear of the drive gear shaft engaged to a lock gear of a lock gear shaft.

Referring to FIGS. 7-8, the drive gear shaft 40 may be rotatably supported by bearings 48 located at opposed ends of the drive gear shaft 40. For example, FIG. 7 illustrates a bearing 48 on a left-hand side of the drive gear shaft 40 rotatably supporting the drive gear shaft 40 in the assembly housing 12. The right-hand side of the drive gear shaft 40 may be rotatably supported by a bearing 48 mounted in a quick release clutch 104. Also shown in FIGS. 7 and 8 is a return spring 50 mounted on the drive gear shaft 40. One end of the return spring 50 may be engaged to a drive gear 44 of the drive gear shaft 40. Although not shown, an opposite end of the return spring 50 may be fixed or attached to the assembly housing 12 (FIG. 7) in any suitable manner. As will be described in greater detail below, the return spring 50 may rotatably bias the drive gear shaft 40 toward its original rotational position upon disengagement of the lock clutch 166. FIGS. 7, 8 and 11 illustrate a drive gear 44 mounted on the drive gear shaft 40. FIG. 11 illustrates the drive gear 44 fixedly coupled to the drive gear shaft 40 by means of a key 46.

Referring to FIGS. 7, 8, 8A and 8B, the torsion lock assembly 60 (FIGS. 7-8) includes a lock clutch 166 (FIGS. 7, 8, 8A) and a quick release clutch 104 (FIGS. 7, 8, 8B). The lock clutch 166 is part of a lock subassembly 150 as shown in FIG. 8A. The quick release clutch 104 is part of a quick release subassembly 80 as shown in FIG. 8B. As shown in FIG. 7, the lock clutch 166 selectively couples the drive gear shaft 40 to the assembly housing 12 to lock the deployable device 210 in position. The quick release clutch 104 selectively couples the drive gear shaft 40 to the output shaft 128 and may rapidly decouple the drive gear shaft 40 from the output shaft 128 when desired as described below.

Referring to FIG. 8A, shown is the lock subassembly 150 which includes the lock clutch 166, a lock spring 162, and an SMA member 68 configured as an SMA tube 152. The lock spring 162 may be comprised of one or more spring washers 164. For example, FIG. 8A illustrates the spring washers 164 configured as a series of Belleville washers arranged in a stacked formation and mounted on the SMA tube 152. The spring washers 164 apply pressure on the lock clutch 166 to engage the lock clutch 166.

Although FIGS. 7, 8 and 8A show the spring washers 164 oriented in back-to-back arrangement relative to one another, the spring washers 164 may be arranged in any orientation including in series and/or in parallel relative to one another or in any combination thereof to provide a desired spring constant and a desired amount of axial displacement capability. Although the lock spring 162 is described as a series of spring washers 164, the lock spring 162 may be provided in alternative configurations such as one or more coil springs (not shown).

The lock subassembly 150 may include washers 155 mounted on opposing ends of the lock spring 162. As described in greater detail below, the washers 155 may be sized such that the combined axial length of the washers 155 plus the axial length of the lock spring 162 corresponds to the length of the SMA tube 152. As shown in FIG. 7, a free end of the SMA tube 152 may be threaded to allow for threadable engagement of a nut 182 for preloading the lock spring 162.

Referring to FIG. 7, the lock clutch 166 includes inner and outer clutch plates 170, 172. The inner clutch plates 170 may be non-rotatably coupled to the lock gear shaft 178. The outer clutch plates 172 may be non-rotatably coupled to the assembly housing 12. The inner clutch plates 170 of the lock clutch 166 may be substantially equal in quantity to the outer clutch plates 172. However, the inner and outer clutch plates 170, 172 may be provided in unequal quantities. Furthermore, although FIG. 7 illustrates a total of thirteen inner and outer clutch plates 170, 172, any quantity may be provided. The lock clutch 166 may include a plug 156 located between the lock clutch 166 and one of the washers 155. The plug 156 may be axially slidable within the assembly housing 12 and may transfer pressure from the lock spring 162 to the inner and outer clutch plates 170, 172. Although illustrated in FIG. 7 as two separate components, it is contemplated that the plug 156 and the SMA tube 152 may be formed as a unitary structure to simplify assembly and maintenance.

Figure 9:
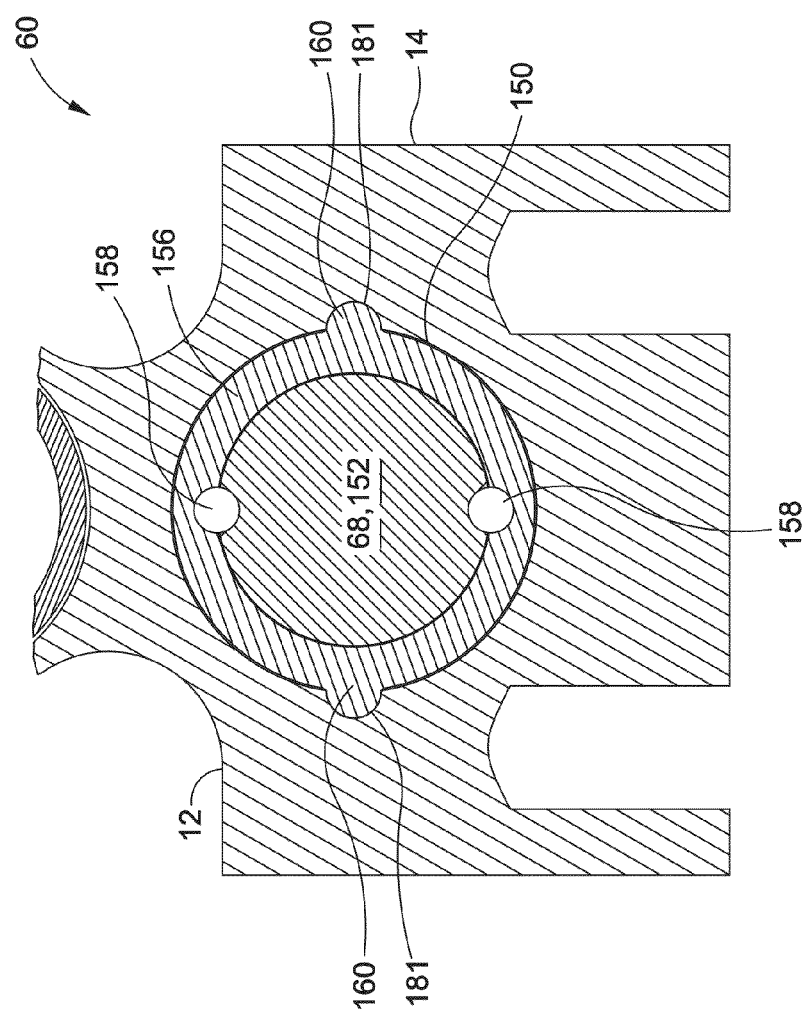
FIG. 9 is a partial sectional view of the torsion lock assembly taken along line 9 of FIG. 7 and illustrating an SMA tube for engaging and disengaging a lock clutch of the lock subassembly.

Referring to FIG. 9, shown is the plug 156 mounted within the assembly housing 12. The plug 156 may include means for preventing rotation of the plug 156 within the assembly housing 12. For example, the plug 156 may include diametrically opposed plug outer lobes 160 which are slidable along axially-oriented housing grooves 181 formed in the assembly housing 12. The engagement of the plug outer lobes 160 within the housing grooves 181 prevents rotation of the plug 156 relative to the assembly housing 12 and allows the plug 156 to move axially relative to the assembly housing 12. The plug 156 may also be non-rotatably mounted to the SMA tube 152 by means of an opposing pair of keys 158 such as dowel pins to prevent rotation of the SMA tube 152 relative to the plug 156. As may be appreciated, other suitable arrangements may be incorporated into the torsion lock assembly 60 to prevent rotation of the SMA tube 152 and plug 156.

Referring to FIG. 10, shown are the inner and outer clutch plates 170, 172 mounted within the assembly housing 12. Each one of the outer clutch plates 172 may include one or more lobes 176 which may be receivable within the axially-extending housing grooves 181 formed in the assembly housing 12. The lobes 176 may prevent relative rotation of the outer clutch plates 172 with respect to the assembly housing 12. Each one of the inner clutch plates 170 may include one or more tangs 174 which may be receivable within axially-extending shaft grooves 179 formed in the lock gear shaft 178. The tangs 174 may prevent relative rotation of the inner clutch plates 170 with respect to the lock gear shaft 178.

Referring to FIGS. 7 and 11, the lock gear shaft 178 may include a lock gear 180 fixedly coupled to the lock gear shaft 178 such as by means of a key 46. The lock gear shaft 178 may be supported by bearings 188 which may be retained within the assembly housing 12 by means of one or more retainer mechanisms 184. As shown in FIGS. 7 and 11, the torsion lock assembly 60 includes the drive gear 44 mounted to the drive gear shaft 40. FIG. 11 illustrates the drive gear 44 and the lock gear 180 having teeth for engaging with one another to couple the drive gear shaft 40 to the lock gear shaft 178.

Referring to FIG. 7, the lock subassembly 150 includes the SMA tube 152 which may be formed as a generally hollow member such that a heating mechanism 70 may be housed within the SMA tube 152. For example, the heating mechanism 70 may comprise a cartridge heater 154 that may be inserted into the SMA tube 152 for applying thermal energy or heat to the SMA tube 152. The SMA tube 152 may be trained to linearly contract when heated. The linear contraction of the SMA tube 152 relieves the pressure applied by the lock spring 162 onto the lock clutch 166 causing the lock clutch 166 to disengage and release the drive gear shaft 40 as described in greater detail below.

The SMA tube 152 may be constructed from an SMA material, such as nitinol, or any other suitable SMA material, such as any nickel-titanium compound or other suitable compound. The SMA material may have a two-way shape effect to allow the SMA tube 152 to extend from an original length to a trained length and to linearly contract from the trained length to the original length. The SMA material facilitates shape change when heated from a first temperature, corresponding to a martensite original shape, to a second temperature, corresponding to an austenite trained shape. The SMA tube 152 may be trained to linearly contract by applying tensile stress (e.g. 15-20 ksi) to the SMA tube 152 when in a martensite condition. When heated above a transition temperature, the SMA tube 152 reaches an austenite condition causing the SMA tube 152 to linearly contract and resume its original length. When cooled such as by allowing heat to dissipate, the SMA tube 152 returns to its extended or trained length in the martensite condition. The material from which the SMA tube 152 is fabricated may provide up to at least approximately 4% or greater recoverable strain when the SMA tube 152 is heated from the first temperature to the second temperature. In this regard, the sizing and shape of the SMA tube 152 may be based upon the amount of recoverable strain occurring in the SMA material upon heating from the austenite condition to the martensite condition.

For example, for a 1.0 inch length of the SMA tube 152, a 3% recoverable strain upon heating of the SMA tube 152 would result in approximately 0.030 inch of linear contraction of the SMA tube 152. The amount of linear contraction may be based upon the amount of axial movement required to disengage the inner clutch plates 170 from the clutch plates of the lock subassembly 150. For example, each one of the inner and outer clutch plates 170, 172 may have a certain amount of waviness or non-planar distortion which may result from the manufacturing process during fabrication of the inner and outer clutch plates 170, 172. The SMA tube 152 may be sized to have a length accounting for the cumulative effect of the waviness of the inner and outer clutch plates 170, 172. If each one of the inner and outer clutch plates 170, 172 has a waviness of approximately 0.001 inch, then a total of thirteen clutch plates would require approximately 0.013 inch of axial displacement to achieve complete disengagement of the inner and outer clutch plates 170, 172.

Additional axial displacement may be required in order to accommodate hysteresis, thermal expansion of the torsion lock assembly 60 components, and manufacturing and assembly tolerances. In this regard, based upon a recoverable strain of approximately 3% in the SMA material during heating, a 1.0 inch length of the SMA tube 152 may linearly contract approximately 0.030 inch which may provide sufficient axial displacement of the inner and outer clutch plates 170, 172 for disengagement from one another. The washers 155 may be sized in accordance with the axial length of the SMA tube 152 such that the combined axial length of the washers 155 plus the axial length of the lock spring 162 corresponds to the axial length of the SMA tube 152. The SMA tube 152 is preferably of a sufficient length such that linear contraction due to heating results in the relief of pressure applied by the lock spring 162 on the lock clutch 166.

Referring still to FIGS. 7-8, the lock subassembly 150 may be assembled by first installing the inner and outer clutch plates 170, 172 of the lock clutch 166. The plug 156 may be installed with the keys 158 (FIG. 9) to prevent rotation of the plug 156 relative to the SMA tube 152. A compressing device (not shown) may be employed during installation of the lock subassembly 150 to compress the spring washers 164 by an amount allowing for installation of the retainer mechanism 184 within the assembly housing 12. Once the inner and outer clutch plates 170, 172, plug 156, washers 155, spring washers 164, and SMA tube 152 are installed, the retainer mechanism 184 may be installed to retain the lock subassembly 150 within the assembly housing 12. The nut 182 may be threadably engaged to the threaded end of the SMA tube 152 and tightened in order to provide a desired amount of pressure against the inner and outer clutch plates 170, 172. In an embodiment, the nut 182 may be tightened or torqued to an extent that any axial movement or play in the arrangement is removed.

Referring to FIG. 8B, shown is the quick release subassembly 80 which may include the quick release clutch 104, a quick release spring 90, and an SMA member 68 configured as an SMA wire 82. The quick release spring 90 may be configured as a coil spring 92 or in other suitable spring configurations. The coil spring 92 causes the application of pressure to the quick release clutch 104 by means of a yoke 98. The yoke 98 is pivotable about a pivot pin 100 which may be coupled to the assembly housing 12 (FIG. 7). The yoke 98 transmits the pressure of the quick release spring 90 to the quick release clutch 104 by means of one or more protrusions 102 which bear against a pressure plate 124. The pressure plate 124 may be mounted on the lock gear shaft 40 and bears against the quick release clutch 104.

Referring to FIG. 7, the yoke 98 couples the quick release clutch 104 to the SMA wire 82. The SMA wire 82 extends between the yoke 98 and an SMA wire adjustment screw 86. The SMA wire adjustment screw 86 may be threadably engaged to the assembly housing 12. The SMA wire 82 may be retained in position by ball ends 84 located on each of opposing ends of the SMA wire 82. One of the ball ends 84 may be fixed to the yoke 98 and the other one of the ball ends 84 may be fixed to the SMA wire adjustment screw 86.

Referring to FIG. 10, shown is the SMA wire 82 extending through the SMA wire adjustment screw 86. The SMA wire adjustment screw 86 may include a slot 88 to allow for installation of the SMA wire 82. Also shown is a spring adjustment screw 96 for adjusting the force applied by the quick release spring 90 (not shown). The spring adjustment screw 96 may be mounted to the assembly housing 12 (FIG. 7) for adjusting the quick release spring 90 (FIG. 7).

Referring briefly to FIG. 11, shown is the SMA wire 82 extending through a slot (not shown) in the assembly housing 12. Also shown is a spring plunger 94 which may be included as part of the spring adjustment screw 96 (FIG. 7) for adjustment of the amount of pressure applied by the quick release spring 90 (FIG. 7). The removable cover 18 shown in FIG. 11 may allow access to the SMA wire adjustment screw 86 and the spring adjustment screw 96.

Referring again to FIGS. 7 and 8B, the quick release subassembly 80 includes the SMA wire 82 which may be of a relatively small diameter to allow for rapid heating of the SMA wire 82. Rapid heating of the SMA wire 82 may facilitate linear contraction of the SMA wire 82 in a relatively short period of time. The SMA wire 82 may be trained to linearly contract or shorten when heated from a first temperature corresponding to a martensite original shape to a second temperature corresponding to an austenite trained shape. The SMA wire 82 may be heated by applying electrical current to the SMA wire 82 to cause resistance heating of the SMA wire 82. The SMA wire 82 may be formed from nickel-titanium material such as nitinol or other suitable SMA materials. Advantageously, SMA materials have relatively high electrical resistance resulting in relatively rapid resistance heating of the SMA wire 82 when electrical current is applied.

Figure 12:
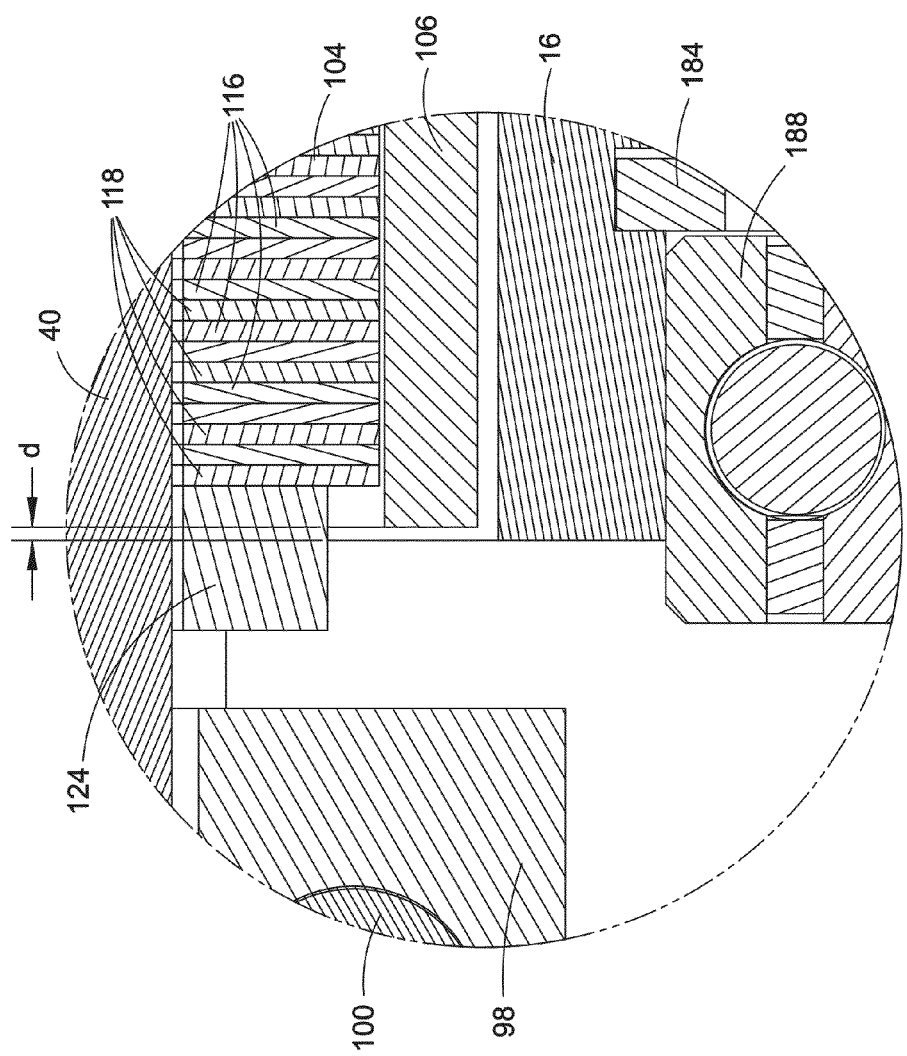
FIG. 12 is an enlarged section view of a portion of the torsion lock assembly taken along line 12 of FIG. 7 and illustrating a clearance between a clutch cup and an end of a first housing portion of the assembly housing.

Referring to FIG. 7, the quick release clutch 104 may include a clutch cup 106 which may include a clutch cup shaft 108. The clutch cup shaft 108 may include a cup shaft output end 110. The clutch cup shaft 108 may be rotatably supported by one or more bearings 112 mounted in the second housing portion 16. The clutch cup shaft 108 functions as the output shaft 128 of the torsion lock assembly 60 for the embodiment illustrated in FIGS. 7-8. Referring briefly to FIG. 12, the quick release clutch 104 is preferably configured to provide clearance d between the clutch cup 106 and the second housing portion 16 to prevent interference between the clutch cup 106 and the yoke 98 and pressure plate 124.

Figure 13:
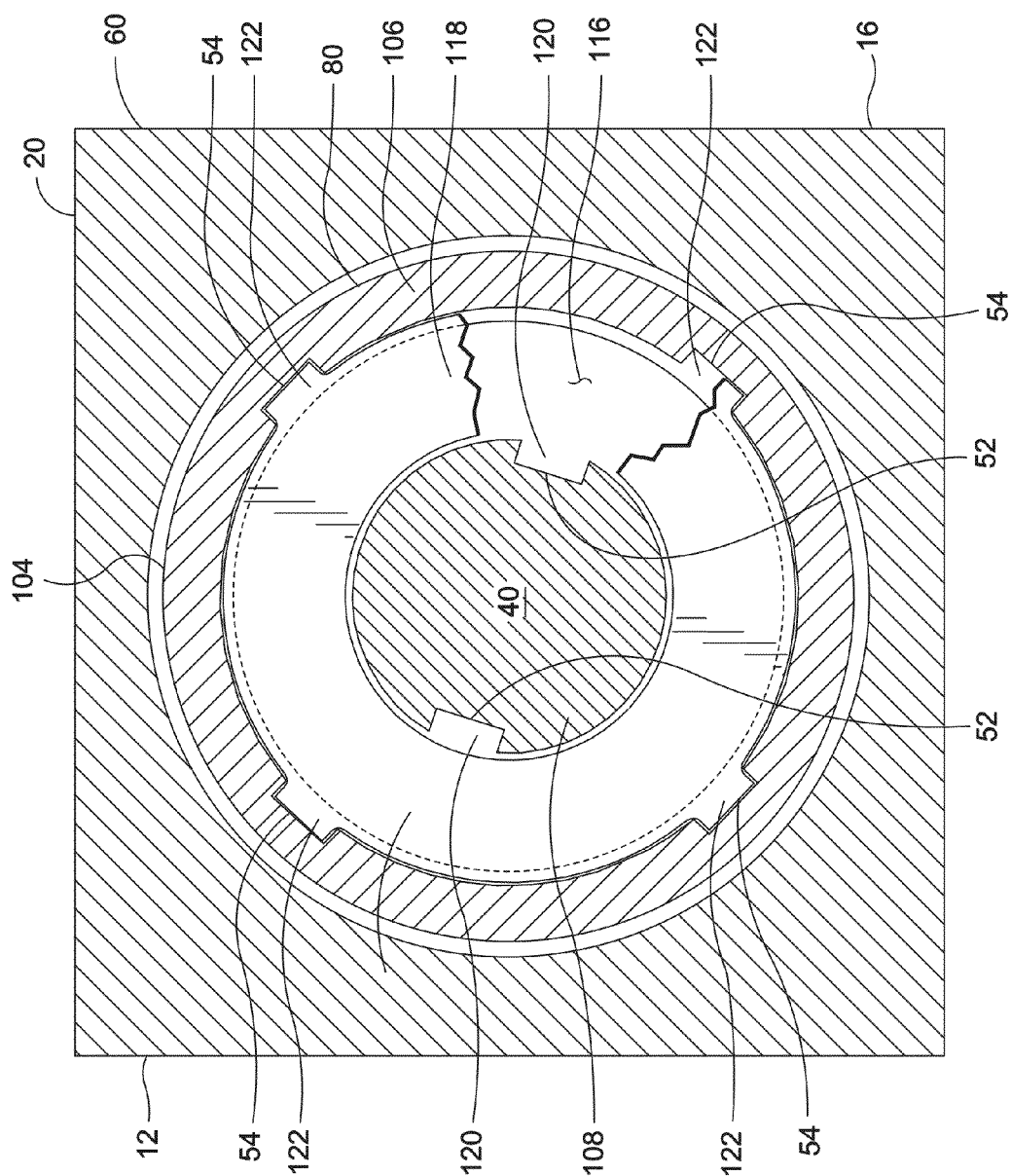
FIG. 13 is a section view of the torsion lock assembly taken along line 13 of FIG. 7 and illustrating inner and outer clutch plates of a quick release clutch.

As shown in FIG. 7, the quick release clutch 104 may include inner and outer clutch plates 116, 118. The inner clutch plates 116 may be non-rotatably engaged to the drive gear shaft 40. The outer clutch plates 118 may be non-rotatably engaged to the clutch cup 106. For example, FIG. 13 illustrates a plurality of tangs 120 formed on the inner clutch plates 116. The tangs 120 may be non-rotatably engaged to shaft grooves 52 formed along the drive gear shaft 40. FIG. 13 further illustrates a plurality of lobes 122 formed on the outer clutch plates 118. The lobes 122 may be non-rotatably engaged to cup grooves 54 formed within the interior surface of the clutch cup 106.

The quick release clutch 104 may include a relatively larger quantity of inner and outer clutch plates 116, 118 compared to the quantity of inner and outer clutch plates 170, 172 of the lock clutch 166. Such larger quantity of inner and outer clutch plates 116, 118 may be required to compensate for the reduced amount of axial pressure applied by the quick release spring 90 due to the reduced force-reacting capability of the relatively small diameter SMA wire 82.

The quick release clutch 104 may be installed by first installing the inner and outer clutch plates 116, 118 over the drive gear shaft 40 and inserting the clutch plates 116, 118 into the clutch cup 106. The spring adjustment screw 96 may be installed in the assembly housing 12. The coil spring 92 may be installed between the spring plunger 94 and the yoke 98. The SMA wire adjustment screw 86 may be threaded into the assembly housing 12 as shown in FIG. 7. The SMA wire 82 may be passed through the slot 88 such that the ball end 84 is captured within the SMA wire adjustment screw 86. The ball end 84 on an opposite end of the SMA wire 82 may be passed through a slot (not shown) in the yoke 98 while the coil spring 92 is compressed to provide slack in the SMA wire 82. Once the SMA wire 82 is connected to the yoke 98, the compression of the coil spring 92 may be adjusted using the spring adjustment screw 96 to provide the desired amount of pressure on the inner and outer clutch plates 116, 118. Tension in the SMA wire 82 may be adjusted by rotating the SMA wire adjustment screw 86 to remove slack in the SMA wire 82.

Referring to FIG. 7, during initial activation of the actuator system 10 to deploy a deployable device 210 (FIG. 2), such as the split flap 214 (FIG. 3), the lock clutch 166 may be disengaged by heating the SMA tube 152 to linearly contract the SMA tube 152. The linear contraction of the SMA tube 152 may disengage the lock clutch 166 by removing pressure applied by the lock spring 162 on the lock clutch 166. With the lock clutch 166 disengaged, the drive gear shaft 40 may rotate relative to the assembly housing 12. While the lock clutch 166 is disengaged, the quick release clutch 104 is preferably engaged such that the output shaft 128 remains coupled to the drive gear shaft 40 causing the output shaft 128 to rotate in unison with the drive gear shaft 40.

The SMA actuator torque tube 24 may then be heated by the heater 26 to cause the SMA actuator torque tube 24 to untwist as it resumes its original pre-twisted shape. The untwisting of the SMA actuator torque tube 24 results in rotation of the deployable device 210 (FIG. 3) toward a desirable rotational position. Once the deployable device 210 is in the desired rotational position, the lock clutch 166 may be engaged by deactivating the cartridge heater 154 contained inside the SMA tube 152 and allowing the SMA tube 152 to cool wherein heat may be dissipated or removed from the SMA tube 152. The dissipation of heat causes a reversal in the linear contraction (i.e., extension) of the SMA tube 152 such that the SMA tube 152 returns to its trained length. The return to the trained length of the SMA tube 152 causes the lock spring 162 to apply pressure to the lock clutch 166 resulting in engagement of the lock clutch 166. The engagement of the lock clutch 166 locks the drive gear shaft 40 to the assembly housing 12 preventing rotation of the drive gear shaft 40.

Referring to FIG. 7, the supply of heat to the SMA actuator torque tube 24 may be halted by deactivating the heater 26 such that the SMA actuator torque tube 24 may be allowed to cool. Due to the angular-spacing between the end fitting ribs 38 (FIG. 10) and the shaft ribs 42 (FIG. 10), the SMA actuator torque tube 24 may return to its trained or twisted shape. The deployable device 210 (FIG. 3) is maintained in its deployed position by the lock clutch 166. Such an arrangement may obviate the need to continuously supply heat to the SMA actuator torque tube 24 to maintain the deployable device 210 (FIG. 3) in the deployed position. In this manner, the torsion lock assembly 60 may reduce consumption of electrical power from the aircraft power system.

Referring still to FIG. 7, the deployable device 210 (FIG. 3) may be released from the deployed position by disengagement of the quick release clutch 104. Disengagement of the quick release clutch 104 is initiated by heating the SMA wire 82 such as by applying electrical current to the SMA wire 82 thereby causing resistance heating. The SMA wire 82 may have a relatively small diameter to allow for rapid heating resulting in linear contraction in a relatively short period of time such as within several milliseconds. The relatively rapid linear contraction of the SMA wire 82 rapidly disengages the quick release clutch 104 by relieving pressure on the clutch plates 116, 118. The relief of pressure on the clutch plates 116, 118 decouples the drive gear shaft 40 from the clutch cup 106 allowing the output shaft 128 and deployable device 210 (FIG. 3) to freely rotate relative to the drive gear shaft 40.

The release of the deployable device 210 (FIG. 3) may prevent overloading of the structure to which the deployable device 210 (FIG. 3) may be mounted. For example, in the event that an aircraft 200 (FIG. 1) encounters wind shear or wind gusts, the quick release clutch 104 may be rapidly disengaged by rapidly heating the SMA wire 82 causing linear contraction of the SMA wire 82 and relief of axial pressure on the quick release clutch 104. The disengagement of the quick release clutch 104 allows for free rotation of the split flap 214 (FIG. 3) such that the split flap 214 (FIG. 3) may rotate out of the airflow (now shown) and move back toward its retracted position which may prevent overloading of the wings 204 (FIG. 3).

Referring still to FIG. 7, although the SMA tube 152 of the lock clutch 166 and the SMA wire 82 of the quick release clutch 104 are each trained to linearly contract or shorten when heated, the amount of force and the reaction time of the SMA tube 152 may be different than the amount of force and the reaction time of the SMA wire 82. For example, since the SMA tube 152 may have a larger diameter than the SMA wire 82 such that the SMA tube 152, the SMA tube 152 may have a greater force-reacting capability than the SMA wire 82. However, the smaller diameter or width of the SMA wire 82, compared to the SMA tube 152, may allow for heating of the SMA wire 82 at a faster rate than the SMA tube 152 resulting in a faster rate of linear contraction of the SMA wire 82 and, thereby, faster decoupling of the quick release clutch 104.

Referring to FIG. 7, although the SMA wire 82 may have less force-reacting capability than the SMA tube 152 due to the smaller diameter of the SMA wire 82, the coupling of the SMA wire 82 to the quick release clutch 104 via the yoke 98 provides a moment arm to effectively increase the axial pressure that may be applied by the quick release spring 90 on the quick release clutch 104. In an alternative embodiment, the quick release clutch 104 may be provided with a larger quantity of clutch plates 116, 118 to effectively increase the total amount of surface area to which the pressure is applied. The increased surface area of the clutch plates 116, 118 may provide increased holding torque such as for reacting to aerodynamic loads that may be imposed on the deployable device 210 (FIG. 3).

Referring to FIGS. 14A-14B, shown is the actuator system 10 with the torsion lock assembly 60 arranged in an alternative embodiment. The actuator system 10 may include the assembly housing 12 which may house the actuator drive assembly 20 and the torsion lock assembly 60. As shown in FIG. 14A, the output shaft 128 and the clutch cup shaft 108 (FIG. 14A) are two separate components. The clutch cup shaft 108 (FIG. 14A) may be accessible from an exterior of the assembly housing 12. As shown in FIG. 14B, the assembly housing 12 may house the actuator drive shaft 22 which may be configured as the SMA actuator torque tube 24 as described above.

Figure 15:
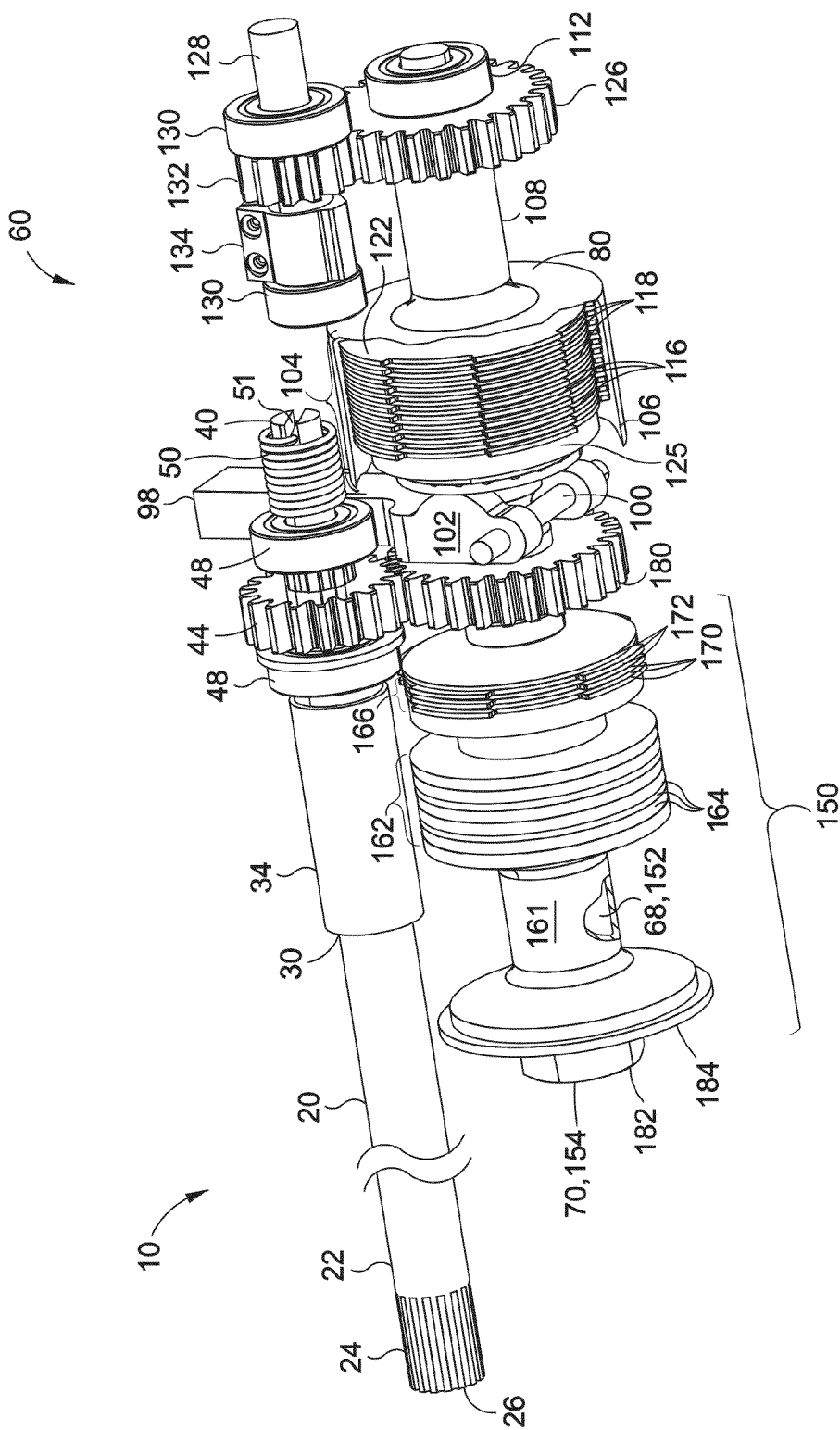
FIG. 15 is a perspective illustration of the alternative embodiment of the torsion lock assembly with the assembly housing removed for clarity and illustrating the quick release clutch axially aligned with the lock clutch.
Figure 16:
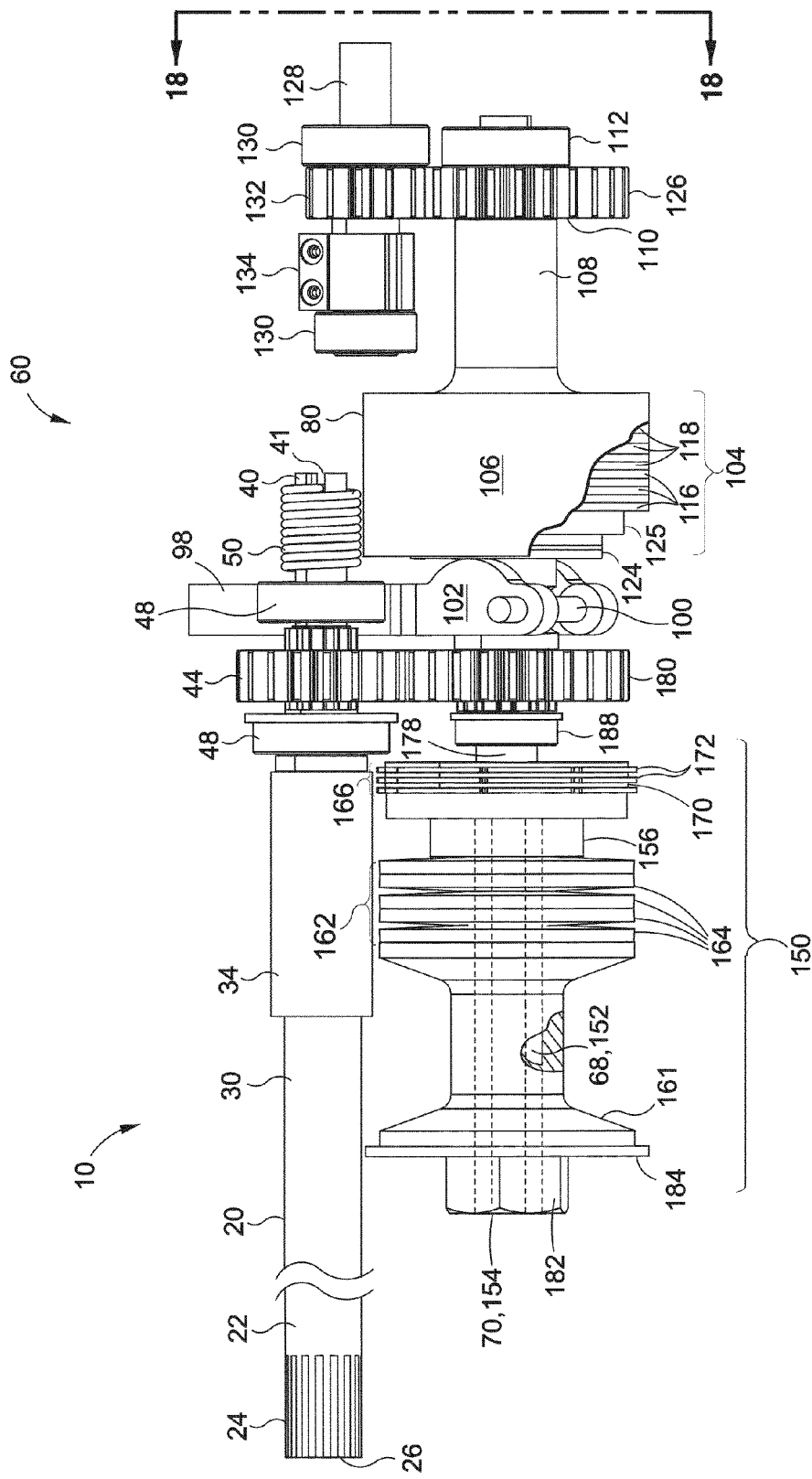
FIG. 16 is a side view illustration of the alternative embodiment of the torsion lock assembly and illustrating the axial alignment of the quick release clutch with the lock clutch.
Figure 17:
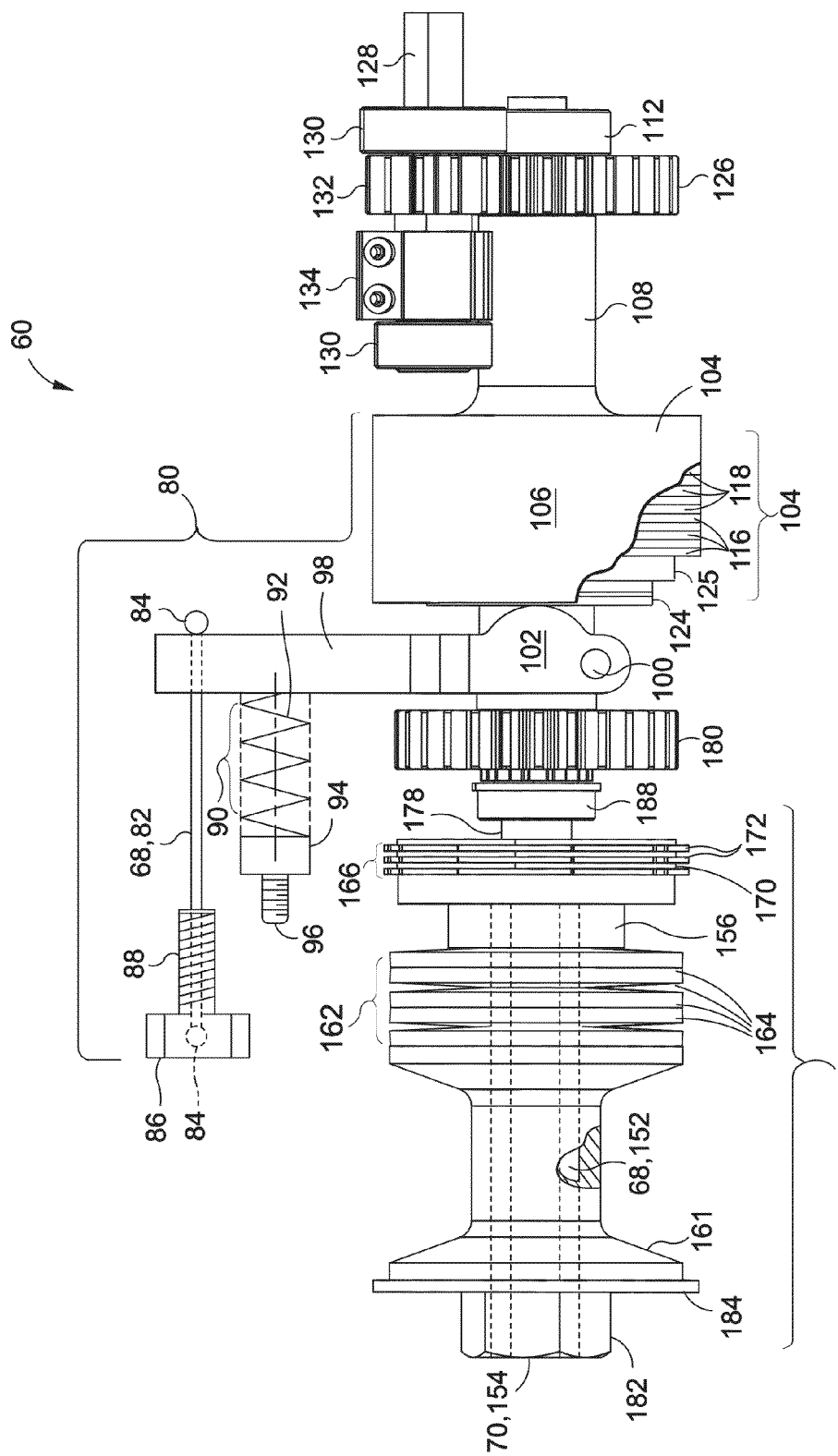
FIG. 17 is an additional side view illustration of the alternative embodiment of the torsion lock assembly.
Figure 19:
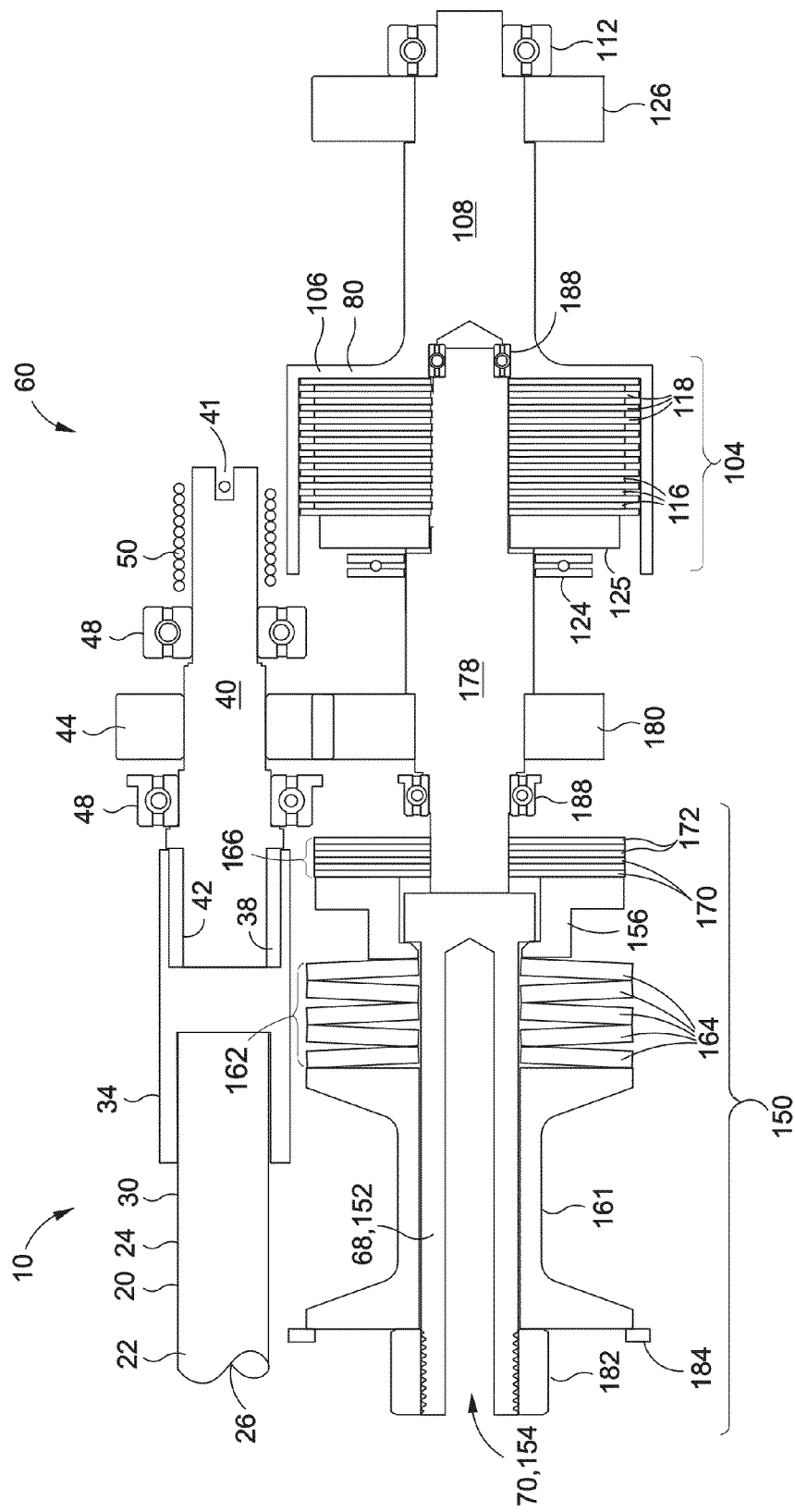
FIG. 19 is a sectional illustration of the alternative embodiment of the torsion lock assembly taken along line 19 of FIG. 18 and illustrating the actuator drive assembly with the lock subassembly and the quick release subassembly.

FIGS. 15-17 illustrate the alternative embodiment of the torsion lock assembly 60 wherein the quick release clutch 104 is axially aligned with the lock clutch 166. In this regard, FIG. 19 illustrates the lock gear shaft 178 extending into the quick release clutch 104. The lock gear shaft 178 is rotatably supported by the bearings 188 on opposite ends of the lock gear shaft 178. One of the bearings 188 may be mounted within the clutch cup 106. The clutch cup shaft 108 may also be supported by at least one bearing 112 located on a right-hand side of the quick release clutch 104 gear.

Figure 18:
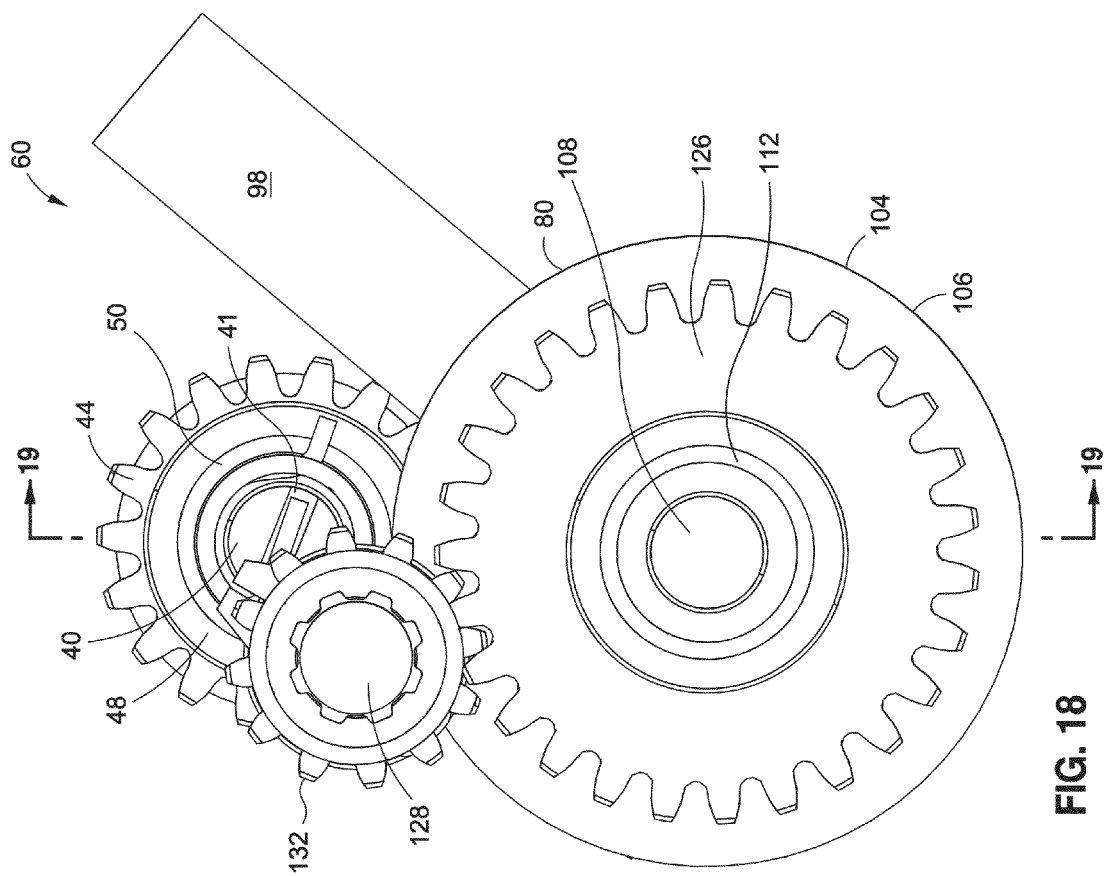
FIG. 18 is an end view of the alternative embodiment of the torsion lock assembly taken along line 18 of FIG. 16 and illustrating the relative positions of the drive gear shaft, quick release clutch, a yoke and an output shaft.

FIGS. 15-17 further illustrate a quick release clutch gear 126 mounted to the clutch cup shaft 108. The quick release clutch gear 126 is engaged to an output shaft gear 132 mounted to the output shaft 128. FIG. 18 illustrates the output shaft gear 132 having teeth that are engaged to the teeth of the quick release clutch gear 126. FIGS. 15-17 further illustrate the output shaft 128 rotatably supported by a pair of bearings 130 located on opposite sides of the output shaft gear 132.

Referring to FIG. 17, during operation of the torsion lock assembly 60, the quick release clutch 104 selectively couples the lock gear shaft 178 to the output shaft 128. Disengagement of the quick release clutch 104 by heating the SMA wire 82 causes linear contraction of the SMA wire 82 which relieves the pressure on the inner and outer clutch plates 116, 118. The relief in pressure on the inner and outer clutch plates 116, 118 results in decoupling of the output shaft 128 from the lock gear shaft 178 and allowing free rotation of the output shaft 128 to which a deployable device 210 (FIG. 3) may be mounted. An adjustable cam 134 may be included on the output shaft 128 for mounting one or more sensors (not shown) to sense the rotational position of the output shaft 128 for driving and/or limiting angular rotation of the deployable device 210 (FIG. 2).

FIGS. 15-17 illustrate a bushing 125 located between the pressure plate 124 and an end-of the inner clutch plate 116. The bushing 125 may transmit pressure from the pressure plate 124 to the inner and/or outer clutch plates 116, 118. As shown in FIGS. 15-17, the inner and outer clutch plates 116, 118 of the quick release clutch 104 may be larger in diameter and fewer in quantity than those of the quick release clutch 104 shown in FIGS. 7-8. The larger diameter results in an increase in contact surface area between the inner and outer clutch plates 116, 118 which allows for a reduced quantity of clutch plates 116, 118. Likewise, the lock clutch 166 shown in FIGS. 15-17 also has inner and outer clutch plates 170, 172 that may be larger in diameter and therefore fewer in quantity than those of the lock clutch 166 shown in FIGS. 7-8.

As shown in FIGS. 15-17, the lock clutch 166 includes a spacer 161 located on one side of the stack of spring washers 164. The spacer 161 is shown as having a relatively long axial length as compared to the axial length of the washers 155 of the lock clutch 166 shown in FIGS. 7-8. The increased length of the spacer 161 allows for a longer length SMA tube 152. As indicated above, the length of the SMA tube 152 is preferably sized to linearly contract by an amount necessary to relieve the pressure applied by the lock spring 162 on the lock clutch 166. A longer length of the SMA tube 152 provides a greater amount of linear contraction to accommodate waviness in the inner and outer clutch plates 170, 172, hysteresis, thermal expansion of the torsion lock assembly 60 components, and manufacturing and assembly tolerances as described above.

Referring briefly to FIG. 16, shown is the return spring 50 which may be connected at one end to a slot 41 formed in the drive gear shaft 40. Although not shown, an opposite end of the return spring 50 may be connected to the assembly housing 12 (FIG. 14A). The return spring 50 acts as a torsion spring and may bias the drive gear shaft 40 back toward its original rotational position upon disengagement of the lock clutch 166 as described below.

Figure 20:
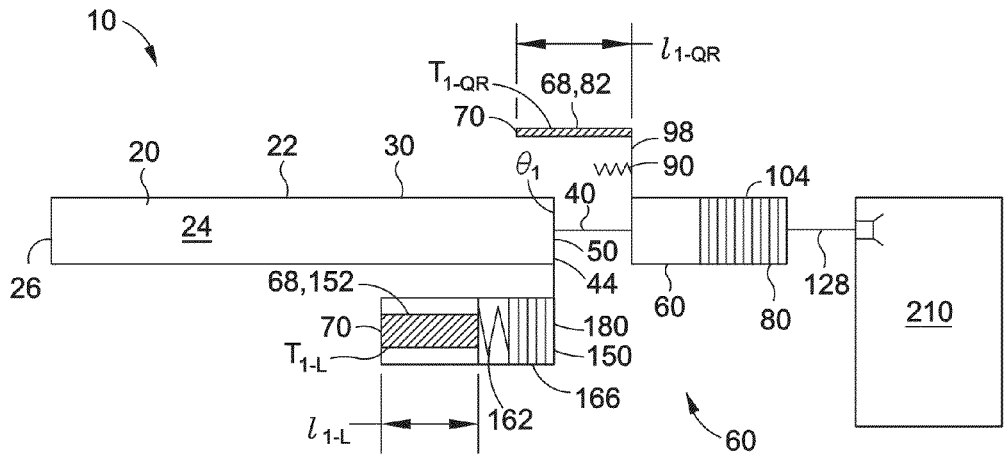
FIG. 20 is a schematic illustration of the torsion lock assembly in the embodiment shown in FIG. 7 and further illustrating the SMA tube of the lock subassembly and SMA wire of the quick release subassembly wherein the SMA tube and SMA wire are in their martensite original (i.e., un-contracted) lengths.

Referring to the schematic diagrams of FIGS. 20-25 and with additional reference to the flow diagram of FIG. 26, the methodology 300 of operating the torsion lock assembly 60 will be described with regard to the embodiment illustrated in FIGS. 7-8. In step 302 of FIG. 26, the actuator drive shaft 22 illustrated in FIG. 20 may be coupled to the assembly housing 12 (FIG. 7) using the lock clutch 166. In this regard, FIG. 20 illustrates the SMA tube 152 of the lock clutch 166 at a first temperature $T_{l-L}$ corresponding to a martensite original shape of the SMA tube 152 and which additionally corresponds to a first length $l_{1-L}$ of the SMA tube 152. The first length $l_{1-L}$ of the SMA tube 152 allows the lock spring 162 to apply pressure to the lock clutch 166 causing engagement thereof. In this regard, step 304 of FIG. 26 comprises engaging the lock clutch 166 by the application of pressure exerted on the lock clutch 166 due to the SMA tube 152 member being at the first length $l_{1-L}$. As shown in FIG. 20, engagement of the lock clutch 166 prevents rotation of the drive gear shaft 40 relative to the assembly housing 12 (FIG. 7).

Figure 26:
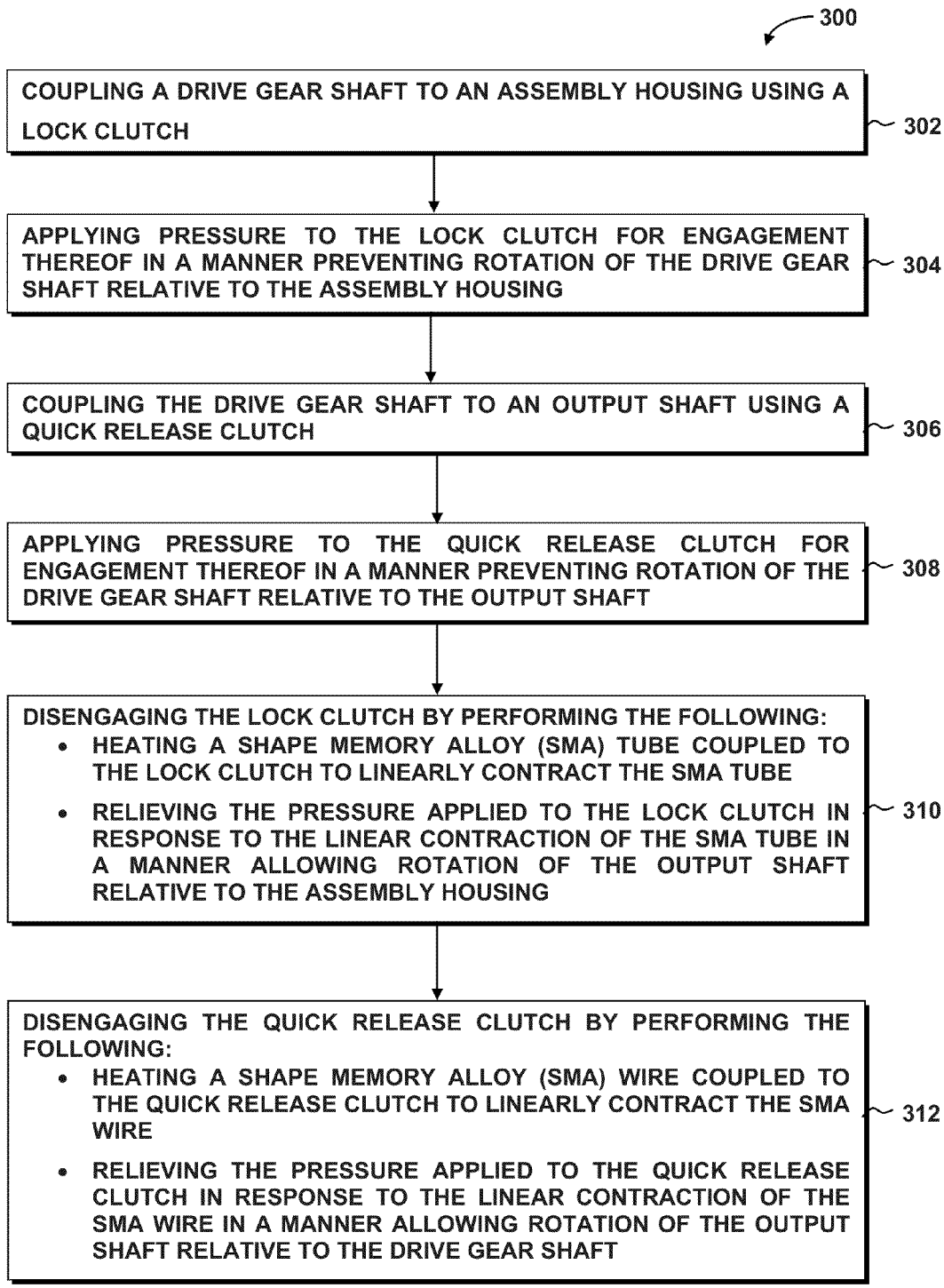
FIG. 26 is an illustration of a flow diagram representing one or more operations that may be included in a methodology for operating the torsion lock assembly.

Step 306 of FIG. 26 comprises coupling the drive gear shaft 40 to the output shaft 128 using the quick release clutch 104 as illustrated in FIG. 20. As shown in FIG. 20, the SMA wire 82 is at a first length $l_{1\text{-}QR}$ corresponding to the martensite original shape of the SMA wire 82 at the first temperature $T_{1\text{-}QR}$. In this regard, step 308 of FIG. 26 comprises engaging the quick release clutch 104 as a result of the application of pressure by the quick release spring 90 against the yoke 98 which, in turn, applies pressure to the quick release clutch 104. The engagement of the quick release clutch 104 prevents rotation of the output shaft 128 relative to the drive gear shaft 40 such that the deployable device 210 rotates in unison with the drive gear shaft 40.

Figure 21:
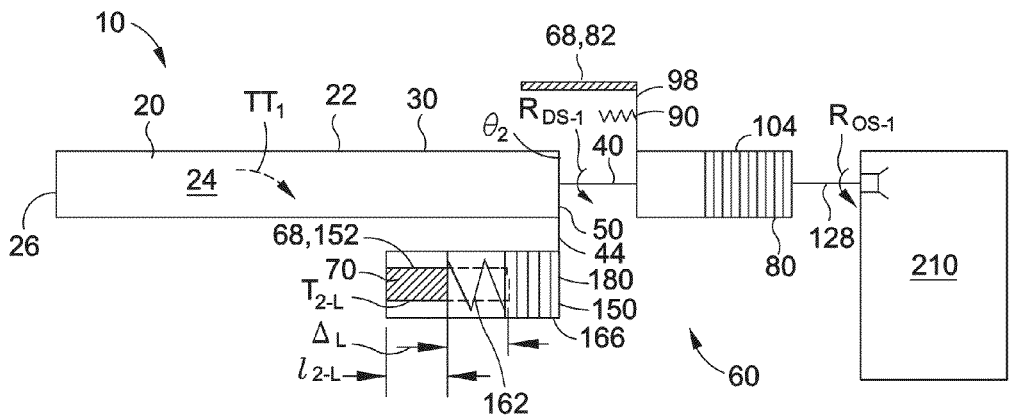
FIG. 21 is a schematic illustration of the torsion lock assembly wherein the SMA tube is heated causing linear contraction from a first length corresponding to the martensite original shape to a second length corresponding to an austenite trained shape and relieving pressure on the lock clutch causing disengagement thereof.

FIG. 21 shows the actuator system 10 wherein the SMA tube 152 is linearly contracted by applying heat to raise the temperature of the SMA tube 152 from the first temperature $T_{1\text{-}L}$ (FIG. 20) to the second temperature $T_{2\text{-}L}$. Such heating of the SMA tube 152 causes linear contraction from the first length $l_{1\text{-}L}$ (FIG. 20) to the second length $l_{2\text{-}L}$ by an amount illustrated as the axial displacement $\Delta_L$ of the SMA tube 152. Due to the linear contraction of the SMA tube 152, the pressure applied by the lock spring 162 on the lock clutch 166 is relieved in step 310 of FIG. 26. Relief of the pressure on the lock clutch 166 allows the drive gear shaft 40 to rotate relative to the assembly housing 12 (FIG. 7).

FIG. 21 further illustrates a first direction of twisting $TT_1$ of the SMA actuator torque tube 24 of the actuator drive shaft 22. The twisting $TT_1$ of the SMA actuator torque tube 24 may occur in response to heating the SMA actuator torque tube 24 causing the SMA actuator torque tube 24 to resume its original pre-twisted shape. The twisting of the SMA actuator torque tube 24 toward its original pre-twisted shape 24 may cause the drive gear shaft 40 to rotate along a direction of rotation $R_{DS\text{-}1}$ shown in FIG. 21. The drive gear shaft 40 rotates from a first rotational position $\theta_1$ illustrated in FIG. 20 to a second rotational position $\theta_2$ illustrated in FIG. 21. The rotation of the drive gear shaft 40 causes similar rotation of the deployable device 210 along a direction of rotation $R_{OS\text{-}1}$ as shown in FIG. 21 due to the coupling of the drive gear shaft 40 to the output shaft 128 when the quick release clutch 104 is engaged.

Figure 22:
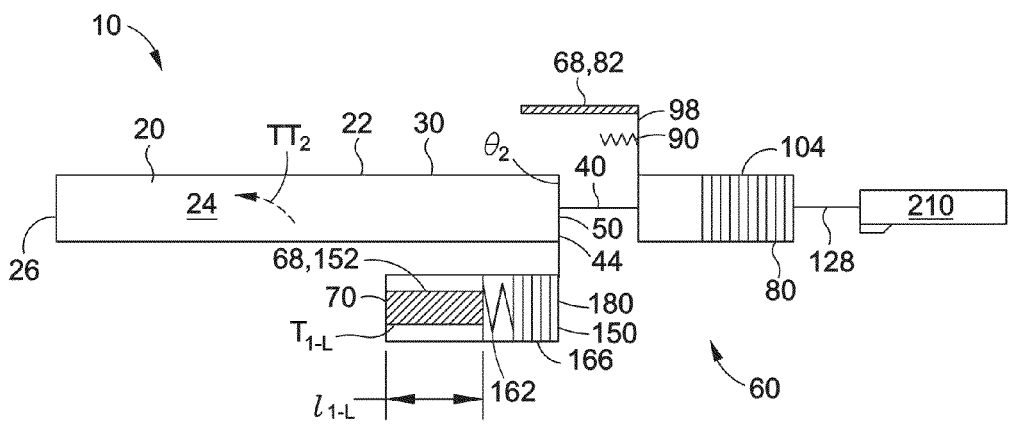
FIG. 22 is a schematic illustration of the torsion lock assembly wherein heat is removed from the SMA tube allowing the SMA tube to return to the first length causing re-engagement of the lock clutch.

FIG. 22 shows the deployable device 210 rotated to a second rotational position $\theta_2$. Heat is removed from the SMA tube 152 of the lock clutch 166 resulting in a reduction in the temperature of the SMA tube 152 from the second temperature $T_{2\text{-}L}$ (FIG. 21) to the first temperature $T_{1\text{-}L}$ (FIG. 22) and a corresponding reversal of the linear contraction of the SMA tube 152. The removal of heat from the SMA tube 152 results in the SMA tube 152 returning to the first length $l_{1\text{-}L}$ as illustrated in FIG. 22 and locking the deployable device 210 in the deployed position. The SMA actuator torque tube 24 may be allowed to cool resulting in twisting along a second direction of twisting $TT_2$ during the return of the SMA actuator torque tube 24 to its trained or twisted shape. The return of the SMA actuator torque tube 24 to its twisted shape may occur without rotation of the drive gear shaft 40 due to the angular-spacing between the end fitting ribs 38 (FIG. 10) and the shaft ribs 42 (FIG. 10) as described above.

Figure 23:
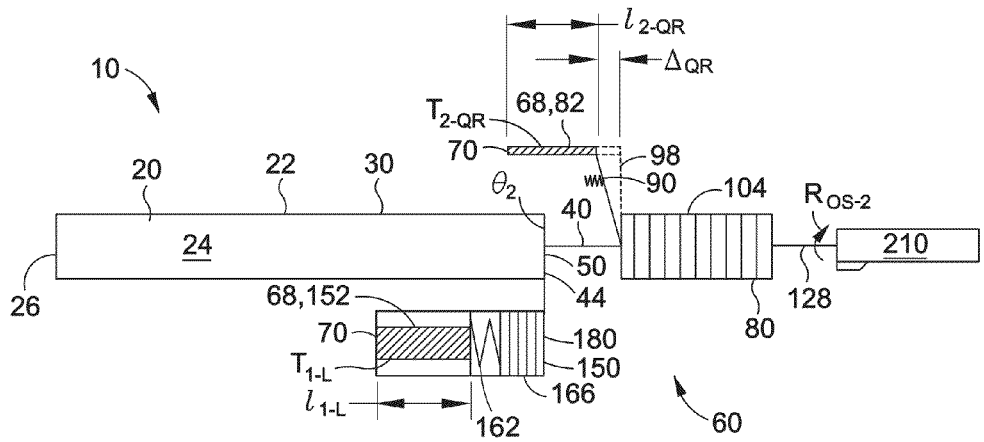
FIG. 23 is a schematic illustration of the torsion lock assembly wherein the SMA wire is shown linearly contracted from the first length to the second length due to heating from a first temperature to a second temperature such that pressure on the quick release clutch is relieved allowing disengagement thereof and free rotation of output shaft and deployment device.

Step 312 of FIG. 26 may comprise heating the SMA wire 82 of the quick release clutch 104 in FIG. 23 from a first temperature $T_{1\text{-}QR}$ (FIG. 20) corresponding to a first length $l_{1\text{-}QR}$ (FIG. 20) of the SMA wire 82 to a second temperature $T_{2\text{-}QR}$ corresponding to a linearly contracted second length $l_{2\text{-}QR}$ of the SMA wire 82 by an axial displacement $\Delta_{QR}$ amount, as shown in FIG. 23. The linear contraction of the SMA wire 82 from the first length $l_{1\text{-}QR}$ (FIG. 20) to the second length $l_{2\text{-}QR}$ (FIG. 23) causes relief of spring pressure applied to the quick release clutch 104 and results in the disengagement of the quick release clutch 104. The disengagement of the quick release clutch 104 results in the decoupling of the output shaft 128 from the drive gear shaft 40 allowing free rotation of the output shaft 128 such as along a direction of rotation $R_{OS\text{-}2}$. In this regard, the disengagement of the quick release clutch 104 may allow the deployable device 210 to freely rotate.

Figure 24:
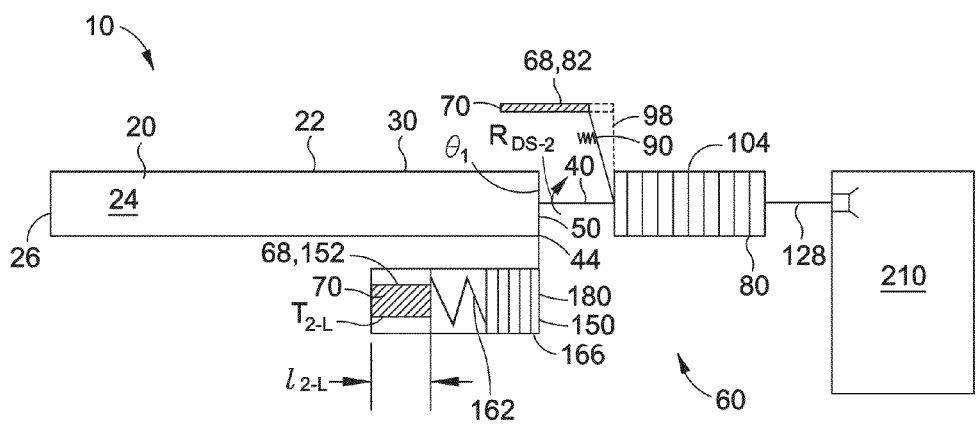
FIG. 24 is a schematic illustration of the torsion lock assembly wherein the SMA tube is heated causing linear contraction thereof to relieve pressure on the lock clutch for disengagement thereof and allowing rotation of the drive gear shaft back to its original position.

FIG. 24 shows the actuator system 10 wherein the lock clutch 166 and quick release clutch 104 are both disengaged due to the application of heat to the SMA tube 152 of the lock clutch 166 and the application of heat to the SMA wire 82 of the quick release clutch 104. The disengagement of the lock clutch 166 due to the application of heat to the SMA tube 152 and linear contraction thereof may allow for rotation of the drive gear shaft 40 along the direction of rotation $R_{DS\text{-}2}$ from the second rotational position $\theta_2$ (FIG. 23) back toward the first rotational position $\theta_1$ as illustrated in FIG. 24. The drive gear shaft 40 may be urged to rotate along the direction of rotation $R_{DS\text{-}2}$ by the return spring 50 which may bias the drive gear shaft 40 back toward the first rotational position $\theta_1$. As can be seen in FIG. 24, the deployable device 210 is shown in its original position which may be equivalent to a retracted position of the split flap 214 illustrated in phantom in FIG. 3.

Figure 25:
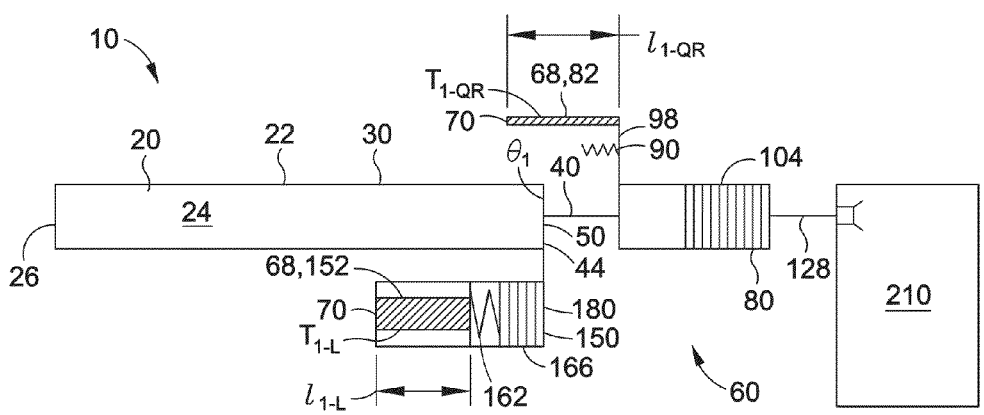
FIG. 25 is a schematic illustration for the actuator system wherein heat is removed from the SMA tube and SMA wire causing re-engagement of the lock clutch and quick release clutch.

FIG. 25 shows components of the actuator system 10 returned to their original positions after heat is removed from the SMA tube 152 and from the SMA wire 82 of the respective lock clutch 166 and quick release clutch 104. The removal of heat from the SMA tube 152 and from the SMA wire 82 may reverse the linear contraction of the SMA tube 152 and return of the SMA wire 82 to their respective first lengths $l_{1\text{-}L}$ and $l_{1\text{-}QR}$ resulting in re-engagement of the lock clutch 166 and quick release clutch 104. As indicated above, engagement of the lock clutch 166 couples the drive gear shaft 40 to the assembly housing 12 (FIG. 7). Engagement of the quick release clutch 104 couples the drive gear shaft 40 to the output shaft 128. In this regard, FIG. 25 illustrates a return of the actuator system 10 to the original positions of the components as illustrated in FIG. 20. From the original position, the deployable device 210 may be deployed by the actuator system 10 to the previously deployed position or to a new position.

Advantageously, the SMA members 68 (i.e., the SMA tube 152 and the SMA wire 82) as shown in FIGS. 7-8 and 15-17 have a relatively high power density with the technical effect of providing a relatively compact and powerful torsion lock assembly 60. Furthermore, the incorporation of the SMA members 68 into the torsion lock assembly 60 results in a relatively high specific holding torque. The torsion lock assembly 60 may be implemented in a variety of applications requiring high specific holding torque and is not limited in incorporation into an actuator system 10 for an aerodynamic device 212 (FIG. 2) of an aircraft 200 (FIG. 2). In this regard, the torsion lock assembly 60 may be implemented in any vehicular or non-vehicular application, without limitation.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A torsion lock assembly, comprising:
   a clutch having a plurality of inner and outer clutch plates being coaxial with one another and independently rotatable and independently axially movable relative to one another;

a spring causing application of pressure on the clutch for engagement;
a heating mechanism; and
a shape memory alloy (SMA) member linearly contracting when actively heated by the heating mechanism in a manner to relieve the pressure on the clutch for disengagement.

2. The torsion lock assembly of claim 1 wherein:
the clutch comprises a lock clutch;
the lock clutch coupling a drive gear shaft to an assembly housing;
the SMA member comprising an SMA tube;
the SMA tube linearly contracting when heated in a manner to decouple the drive gear shaft from the assembly housing to allow rotation of the drive gear shaft.

3. The torsion lock assembly of claim 1 wherein:
the clutch comprises a quick release clutch;
the quick release clutch coupling a drive gear shaft to an output shaft;
the SMA member comprising an SMA wire;
the SMA wire linearly contracting when heated in a manner to decouple the drive gear shaft from the output shaft to allow relative rotation.

4. The torsion lock assembly of claim 3 wherein:
the output shaft is coupled to a deployable device.

5. The torsion lock assembly of claim 4 wherein:
the deployable device comprises an aerodynamic device of an aircraft.

6. The torsion lock assembly of claim 3 further comprising:
a yoke coupling the SMA wire to the quick release clutch;
the spring applying pressure to the yoke;
the yoke transmitting the pressure to the quick release clutch.

7. The torsion lock assembly of claim 3 wherein:
the quick release clutch has a plurality of clutch plates and a clutch cup;
at least one of the clutch plates being non-rotatably coupled to the clutch cup;
at least one of the clutch plates being non-rotatably coupled to the drive gear shaft;
the SMA wire linearly contracting when heated in a manner to disengage the clutch plates to allow rotation of the clutch cup relative to the drive gear shaft.

8. The torsion lock assembly of claim 1 wherein:
the clutch comprises a pair of clutches including a lock clutch, having a lock gear shaft, and a quick release clutch, having a clutch cup;
the quick release clutch coupling the lock gear shaft to the clutch cup.

9. The torsion lock assembly of claim 1 wherein:
the plurality of clutch plates are rotatable relative to one another;
the spring causing the application of axial pressure on the clutch plates for engagement with one another in a manner preventing relative rotation;
the linear contraction of the SMA member relieving axial pressure on the clutch plates for disengagement in a manner allowing relative rotation of the clutch plates.

10. A torsion lock assembly for an actuator system having a drive gear shaft, comprising:
an assembly housing;
a lock subassembly, including:
a lock clutch coupling the drive gear shaft to the assembly housing and having a plurality of clutch plates being independently axially movable relative to one another;
a lock spring causing the application of pressure on the lock clutch for engagement; and
a shape memory alloy (SMA) tube linearly contracting when heated to relieve pressure on the lock clutch for disengagement and allow rotation of the drive gear shaft; and
a quick release subassembly, including:
a quick release clutch coupling the drive gear shaft to an output shaft and having a plurality of clutch plates being independently axially movable relative to one another;
a quick release spring causing the application of pressure on the quick release clutch for engagement; and
an SMA wire linearly contracting when heated to relieve pressure on the quick release clutch for disengagement and allow rotation of the output shaft relative to the drive gear shaft.

11. A method of disengaging a clutch, comprising the steps of:
applying, using a spring, pressure to the clutch for engagement, the clutch having a plurality of inner and outer clutch plates being coaxial with one another and independently rotatable and independently axially movable relative to one another;
actively heating, using a heating mechanism, a shape memory alloy (SMA) member coupled to the clutch;
linearly contract the SMA member in response to the active heating by the heating mechanism; and
relieving the pressure on the clutch in response to the linear contraction of the SMA member in a manner causing disengagement of the clutch.

12. The method of claim 11 wherein the clutch includes a plurality of clutch plates, the method further comprising the steps of:
axially pressuring the clutch plates into engagement with one another to prevent relative rotation of the clutch plates; and
linearly contracting the SMA member to relieve the axial pressure on the clutch plates for disengagement to allow relative rotation.

13. The method of claim 11 wherein the clutch comprises a lock clutch, the SMA member comprising an SMA tube, the method further comprising the steps of:
coupling a drive gear shaft to an assembly housing the lock clutch; and
linearly contracting the SMA tube in response to heating to decouple the drive gear shaft from the assembly housing to allow rotation of the drive gear shaft.

14. The method of claim 13 further comprising the steps of:
rotating the drive gear shaft from a first rotational position toward a second rotational position;
engaging the lock clutch to lock the rotational position of the drive gear shaft relative to the assembly housing; and
removing heat from the SMA tube of the lock clutch to reverse the linear contraction of the SMA tube to allow the drive gear shaft to rotate relative to the assembly housing.

15. The method of claim 14 wherein the clutch comprises a pair of clutches including the lock clutch, having a lock gear shaft, and a quick release clutch, the SMA member comprising a pair of the SMA members including the SMA tube and an SMA wire, the method further comprising the steps of:
coupling the drive gear shaft to an output shaft using the quick release clutch; and
linearly contracting the SMA wire in response to heating to decouple the drive gear shaft from the output shaft to allow rotation of the output shaft.

16. The method of claim 14 wherein the clutch comprises a pair of clutches including the lock clutch, having a lock gear shaft, and a quick release clutch, the SMA member comprising a pair of the SMA members including the SMA tube and an SMA wire, the method further comprising the steps of:
 coupling the lock gear shaft to an output shaft using the quick release clutch; and
 linearly contracting the SMA wire in response to heating to decouple the lock gear shaft from the output shaft to allow rotation of the output shaft.

17. The method of claim 11 wherein the clutch comprises a quick release clutch, the SMA member comprising an SMA wire, the method further comprising the steps of:
 coupling a drive gear shaft to an output shaft using the quick release clutch; and
 linearly contracting the SMA wire in response to heating to decouple the drive gear shaft from the output shaft to allow rotation of the output shaft.

18. The method of claim 17 wherein the quick release clutch includes a plurality of clutch plates and a clutch cup, the method further comprising the steps of:
 non-rotatably coupling at least one of the clutch plates to the clutch cup;
 non-rotatably coupling at least one of the clutch plates to the drive gear shaft; and
 linearly contracting the SMA wire in response to heating to disengage the clutch plates to allow rotation of the clutch cup relative to the drive gear shaft.

19. The method of claim 17 further comprising the step of:
 coupling a deployable device to the output shaft.

20. The method of claim 19 wherein:
 the deployable device comprises an aerodynamic device of an aircraft.

* * * * *